United States Patent [19]
Altschuler et al.

[11] Patent Number: 6,035,949
[45] Date of Patent: Mar. 14, 2000

[54] METHODS FOR INSTALLING A WELL IN A SUBTERRANEAN FORMATION

[76] Inventors: Sidney J. Altschuler, 1331 Goethals Dr., Apt. #8, Richland, Wash. 99352; Russell D. Hickerson, 1105 Essex St., Odessa, Tex. 79763

[21] Appl. No.: 09/018,229

[22] Filed: Feb. 3, 1998

[51] Int. Cl.⁷ ..................................................... E21B 7/26
[52] U.S. Cl. .................................. 175/19; 175/65; 299/5
[58] Field of Search ............................ 299/5, 6; 175/19, 175/65, 67

[56] References Cited

U.S. PATENT DOCUMENTS

| | | | |
|---|---|---|---|
| 72,857 | 12/1867 | Hutchinson | 175/19 |
| 2,618,475 | 11/1952 | Butler, Jr. | 299/5 |
| 3,012,764 | 12/1961 | Jacoby | 299/5 |
| 3,086,760 | 4/1963 | Bays | 299/5 |
| 3,297,362 | 1/1967 | Currier | 299/5 |
| 3,556,597 | 1/1971 | Porter | 299/5 |
| 3,967,675 | 7/1976 | Georgii | 165/45 |
| 4,052,857 | 10/1977 | Altschuler | 60/641.2 |
| 4,239,288 | 12/1980 | Thompson et al. | 299/5 |
| 4,596,490 | 6/1986 | Van Fossan et al. | 405/58 |
| 5,127,710 | 7/1992 | Babichev et al. | 299/17 |
| 5,370,182 | 12/1994 | Hickerson | 166/401 |

OTHER PUBLICATIONS

Geothermal Power From Salt Domes, S. J. Altschuler, Society of Automotive Engineers, Inc. 1978.
Heat Transfer in Conduction Limited Geothermal Wells, S. J. Altschuler, Transactions of the American Nuclear Society Winter Meeting, Washington, D.C. Nov. 1978.
Heat Mining in Salt Domes, S. J. Altschuler, Economic and Alternate Heat Mining Technologies Session, 3rd International Hot Dry Rock Forum, Santa Fe, NM May 1996.
Salt Domes As A Source of Geothermal Energy, Charles H. Jacoby, Dilip K. Paul, International Salt Co., Society of Mining Engineers, May 1974.

*Primary Examiner*—Eileen Dunn Lillis
*Assistant Examiner*—John Kreck
*Attorney, Agent, or Firm*—Reidlaw, L.L.C.; John S. Reid

[57] ABSTRACT

This invention uses a combination of drilling, dissolving, and sinking to emplace a closed end well pipe into a salt formation. The well which results can be used to produce geothermal power or for such other purposes for which it may offer an advantage. This method uses the following combination of properties of salt to achieve the desired result: solubility in water, plasticity at relatively low temperatures, and occurrence in large, deeply penetrating structures.

32 Claims, 20 Drawing Sheets

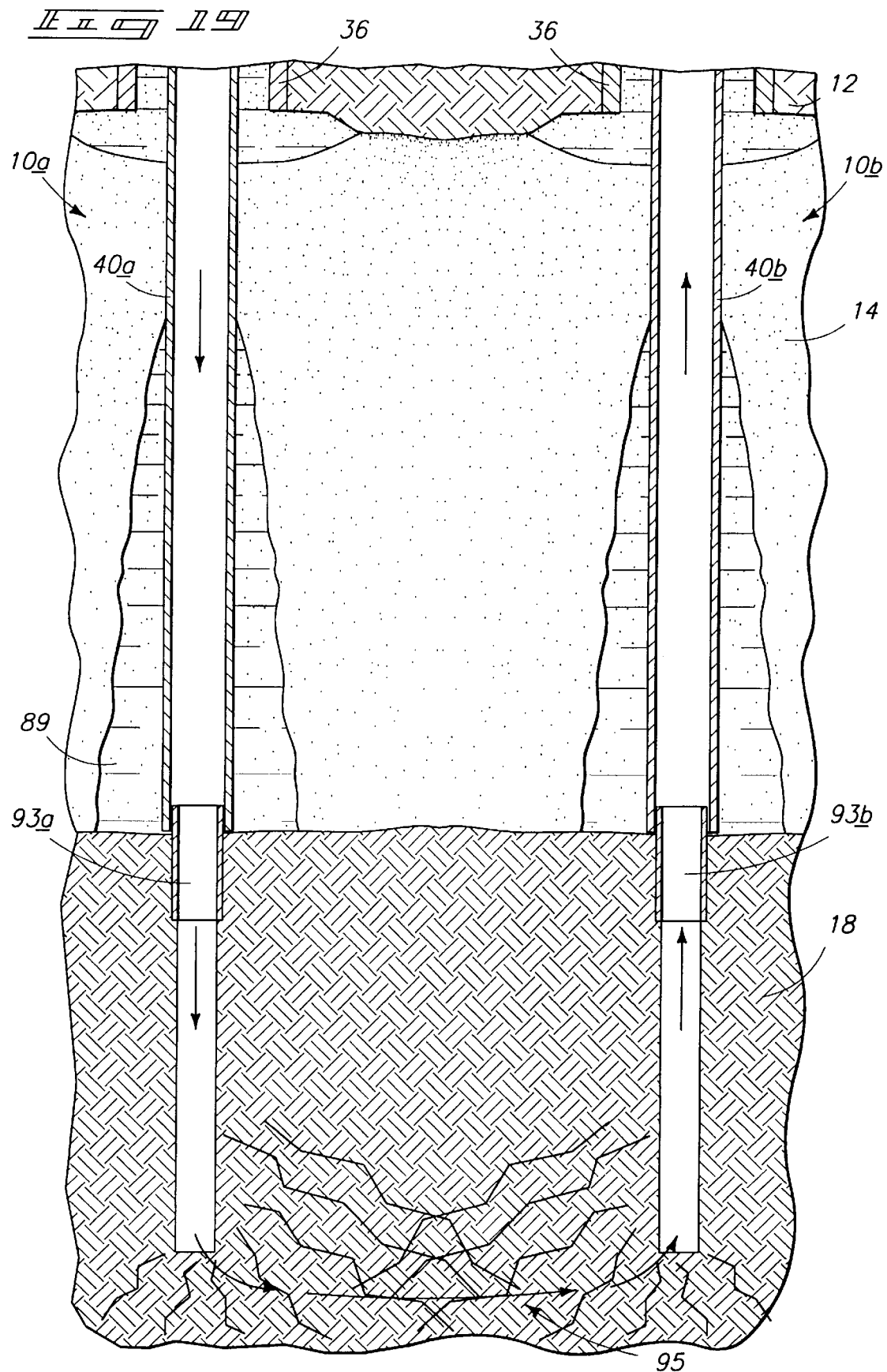

METHODS FOR INSTALLING A WELL IN A SUBTERRANEAN FORMATION

TECHNICAL FIELD

The present invention relates to methods for installing a well in a subterranean formation, specifically a salt dome, thick layered salt, or an evaporite basin.

BACKGROUND OF THE INVENTION

The production of geothermal energy for generating electricity is limited by the need to obtain sufficient temperatures (currently about 300° F.) and heat flow. While in principle such temperatures can be gotten almost anywhere if one drills deep enough, in practice drilling to these depths becomes prohibitively expensive. The production of electricity from geothermal power becomes the search for geological anomalies which are sufficiently hot and shallow to be economically competitive. When found, such anomalies involve the mining of either fluids or heat.

Fluid Mining

Producing geothermal energy from naturally occurring hot water or steam involves the simultaneous occurrence of several contingencies: hot rock at a sufficiently small distance below the surface, the presence of water or steam, and sufficiently porous rock that the flow of water or steam to the well and the heating of the hot rock can be maintained. While the production of steam is more desirable than that of hot water, it should be recalled that a geyser is a hot spring with an insufficient water supply. Despite recycle and reinjection of any unused water, depletion is inevitable. Such depletion can be estimated by adapting the usual methods used for gas and oil.

Heat Mining

Heat mining methods provide their own working fluids rather than rely upon natural ones.

The approach known as Hot Dry Rock involves finding hot rock at an accessible depth, drilling at least two wells, and fracturing a connection between them by applying hydraulic pressure. Cold water is then passed down one well and hot water emerges from the other after being heated by its passage through the heat transfer area formed by the fractures in the hot rock. The thermal stresses in the hot rock as it cools should open cracks exposing additional passageways for contact with the hot rock. On the other hand, the continued expansion of the passageways by the contracting rock as it cools will channel the liquid to cooler regions. This results in a complex system, the long-term behavior of which is not well understood. The economic effect of such uncertainty must be added to the cost of drilling deep wells into very hard rock.

An alternative to Hot Dry Rock was offered by Jacoby (U.S. Pat. No. 3,676,073) who proposed to dissolve a cavern in salt domes and produce energy by circulating a fluid which would be heated by thermal conduction through the salt to the cavern walls. Problems include the cost of dissolving the cavern and providing the fluid (presumably a hydrocarbon or other organic liquid which would not dissolve the salt which formed the cavern), achieving a useful circulation pattern, and preventing the cavern from closing.

Calculations by Altschuler in an attempt to determine the energy output as a function of cavern size and thus estimate cost showed that the smaller the diameter, the larger the heat flux through the cavern wall per unit of cavern height. This implied the somewhat surprising result that as the cavern diameter decreased, the heat flux increased faster than the cavern wall area decreased. This is explainable by the fact that a unit area on a plane wall will receive the heat flux from other volume elements which pass through areas of equal size. For a unit area on the wall of a circular cylinder, the heat flux from other volume elements will pass through areas of increasing size as the distance from the cavern wall increases. This effect will increase as the cavern diameter decreases, so that a small diameter well becomes a quite efficient means of extracting heat from a geological formation if it can be installed. Once the outer well pipe is in place in the formation, an insulated inner pipe with an open end is installed, thus forming a double pipe heat exchanger. The production of geothermal energy with a double pipe heat exchanger has been described by the Futures Group in a publication for the National Science Foundation (1975). A possible design of the internals of such a system was published by J. H. Warren and R. L. Whitelaw (1975). More recently such a system, dubbed a Downhole Coaxial Heat Exchanger, has been installed and tested in a hot volcanic rock formation in Hawaii albeit entirely by drilling to rather shallow depths (about 3,000 ft.) as described in several publications by Koji Morita et al.

Altschuler proposed (U.S. Pat. No. 4,052,857) to install a double pipe heat exchanger in a salt dome by taking advantage of the plastic behavior of salt by:

1. Drilling and casing a well into a salt dome to a depth at which the salt behaves plastically;
2. Inserting a pipe filled with removable weights and fitted with a closed, pointed end into the well (this outer well pipe which fits inside the casing is filled with water or brine in addition to the weights to help prevent its collapse);
3. Sinking the pipe through the plastic salt to a depth at which the energy output is maximized (ideally, this would be the bottom of the salt dome or formation, i.e., the base salt from which the dome arises);
4. Removing the weights and installing internals (the inner well pipe and insulation) to convert the system into a double pipe heat exchanger.

Because of the requirement that the salt be sufficiently plastic to allow the weighted pipe to sink quickly enough to be economically feasible and because of the uncertainty in estimating a value of the "effective viscosity" of salt as a function of temperature, this method is restricted to salt domes where the salt is believed to be sufficiently hot immediately upon entering the dome. This limits the method's applicability to "deep" domes (where the top of the salt is greater than 10,000 ft. below the surface) or some of the deeper "intermediate" domes (where the top of the salt is 4,000 to 10,000 ft. below the surface). Not only does this limit the area of the resource available, but drilling through the extensive overburden becomes the major cost item of this geothermal system.

SUMMARY OF THE INVENTION

Use of Dissolving to Enable Sinking

It was realized soon after the patent (U.S. Pat. No. 4,052,857) was issued that while the weighted pipe would sink into the plastic salt, the salt displaced by the sinking pipe needed someplace to go. If such was not provided, there were two possibilities. Room could be provided by jacking up the entire overlying strata, or the salt would flow up between the casing and the outer well pipe and upon cooling become viscous and seize up. In either case, sinking the outer well pipe to the desired depth would become difficult if not impossible.

The solution to this problem is to provide some place for the plastic salt to go as it is displaced by the sinking weighted outer well pipe. This is to be done by dissolving a small cavern around the casing where it enters the dome. This cavern should have a volume at least equal to the volume displaced by the outer well pipe if it sank to the bottom of the salt formation, plus enough more for contingencies. When formed, the cavern is filled with brine which is displaced by the plastic salt as the outer well pipe sinks. The brine is forced to the surface through the annular space between the casing and the outer well pipe where it may be stored and reused. While the shape of the cavern is of considerable importance for many applications, here the only requirement is that it be sufficiently large and shaped roughly hemispherical (all points on its surface being equidistant from the casing) so that the outer well pipe can sink to the bottom of the dome before the plastic salt reaches the casing and causes binding. This cavern is expected to be formed by conventional methods, possibly nothing more elaborate than using a relatively small diameter pipe through the casing to introduce water and the use of an oil pad or moving the pipe to create a hemispherical shape.

Use of Dissolving to Reach Hot Plastic Salt

Once the need to dissolve a cavern in the salt (discussed above) became apparent, the cost was investigated. The cost was sufficiently low that using dissolving to replace drilling if at all possible became economically desirable. Not only would this lower the cost of emplacing the well in the salt formation, but it would extend the resource to all "intermediate" domes and the deeper of the "shallow" domes as well. This would greatly increase the number of domes and acreage available to produce geothermal energy.

As conceived, the process would be to drill and case a well into the relatively shallow and cold salt, dissolve a small hemispherical cavern (radius about 10 ft.) around the entrance to the salt to prevent binding by the salt between the casing and outer well pipe when it was inserted, and then dissolve a small diameter, straight, deep hole through the salt until a depth was reached where the salt was hot enough to be plastic and allow sinking of the outer well pipe. At this point, the procedure could return to that previously used for deep domes where the salt when entered was sufficiently hot and plastic to allow sinking. A cavern of sufficient volume (equal to that displaced by the outer well pipe sinking from this cavern depth to the bottom of the salt formation plus contingencies) is dissolved and left filled with brine. The well casing, small hemispherical upper cavern and connection between the caverns are also filled with brine. The outer well pipe with its closed pointed end is lowered into the hole until it reaches the bottom of the lower cavern, filled with brine or water as necessary to prevent collapse, and removable weights added. The outer well pipe then sinks through the hot plastic salt to the bottom of the formation. The salt it displaced closes the lower cavern and region around the pipe until the colder and less plastic salt of the upper cavern is reached. The brine displaced by the plastic salt is pushed through the annulus between the casing and outer well pipe to the surface to be stored, reused, or otherwise disposed of. The outer well pipe has its weights unloaded, converted into a double pipe heat exchanger by inserting an insulated inner pipe with open ends, and any brine in it replaced by water or other working fluid.

It is expected that the dissolving of the small diameter, straight, deep hole and lower cavern in the plastic salt will be dissolved by the aforementioned conventional means: a small diameter pipe to provide water directly to the location to be dissolved, another if necessary to remove the brine, and an oil pad to prevent dissolving more salt than is required.

The alternative to dissolving the hole before installing the outer well pipe is to do both at the same time. Two ways to do this are described.

The first uses the outer well pipe to provide the water for dissolving. Its pointed end has holes from which water pumped through it can contact the salt under it, dissolve the salt, and the small amount of brine so produced passes up the small hole it dissolves around the outer well pipe. The weighted outer well pipe not only tends to sink through the salt but presses through any undissolved material as well and applies the water pumped through it to the fresh salt face. Potentially, the bottom of the salt formation could be reached entirely by dissolving rather than sinking. If not, one solution is to stop or slow temporarily along the way to dissolve a cavern of sufficient volume to receive the salt displaced by sinking. Using the outer well pipe in this way will require continually reconnecting the pumped water supply as more pipe sections are added, a stool at its bottom to support the weights and keep them from blocking the flow of water through the pointed end, a means of closing the water supply hole to the pointed end when the outer well pipe has been installed, and possibly a small diameter pipe to remove the brine. This pipe would be attached to the outer well pipe, could be used in conjunction with an oil pad, and sacrificed to install the outer well pipe in that it would simply be left in place.

Another method of dissolving while installing the outer well pipe would not involve pumping water through it as above, but would leave the pointed end closed as in the original concept. Instead, two small pipes attached to the outer well pipe would be used with a "dunce cap" fitted on the closed pointed end. The "dunce cap" would provide a water distribution system to dissolve the salt. It would be fed water by one of the small pipes. The other small pipe would withdraw brine. The flair on the pointed end may limit travel to a one-way trip through the salt, but would minimize the amount of salt dissolved and preferably be used in conjunction with an oil pad. Both small pipes and the "dunce cap" would be left in place.

The exact point at which the installation of the outer well pipe switches from dissolving to sinking or some combination of both processes at the same time will be determined in practice by the conditions encountered in the salt formation. Similarly, the exact technique used in dissolving the required caverns and holes will be determined by conditions found and may include other methods than those proposed explicitly in the previous paragraphs. These will include methods currently used in the industry or that may be adapted from them.

Use of a Well Emplaced in a Salt Formation to Economically Access the Strata Underneath As has been previously mentioned, Hot Dry Rock involves finding a geological anomaly of hot rock at an accessibly shallow depth which unfortunately usually involves drilling through hard rock. The ability to penetrate to the bottom of salt formations at relatively low cost by a combination of drilling (through relatively soft sedimentary rock), dissolving, and sinking offers an economical way to reach the strata below them. The depth of this subsalt strata should provide a high enough temperature in many cases to make Hot Dry Rock technology applicable. In essence, the outer well pipe emplaced to the bottom of the salt formation as described previously is used as a caisson (admittedly of very small diameter) to allow relatively inexpensive access for drilling into the subsalt rock. While this subsalt rock may be granite, it may not be and thus softer to drill through.

This would seem to be merely exchanging one geological anomaly (hot rock at an accessibly shallow depth) for another (subsalt strata hot enough to be useful). In reality, it would be appreciably extending the resource by adding other geological features that could be exploited. This would include salt domes that do not extend to the base salt, salt dome and evaporite basins which are not deep enough to produce geothermal power economically, and areas under thick layered salt. The only restriction would seem to be the requirement to penetrate the subsalt strata sufficiently that the hydrofracted connections between wells do not reach as high as the salt and allow it to be dissolved by the liquid circulated. Certainly, this would apply to salt formations (domes) being used for geothermal power. However, it may not apply to other less useful salt formations.

The problem in applying this idea is the need to remove the closed end of the outer well pipe and penetrate the subsalt strata to emplace the caisson before the relatively plastic salt interferes. One solution is to "freeze" the salt, i.e., cool the salt in contact with the outer well pipe at the bottom of the salt formation sufficiently that it becomes far more viscous and resistant to flow for long enough to make the connection between the outer well pipe and the subsalt strata. This will require removing the closed end of the outer well pipe, drilling into the subsalt strata, emplacing a length of pipe inside the outer well pipe which penetrates the subsalt strata and overlaps into the outer well pipe, and then sealing its ends to the outer well pipe and the subsalt strata. Previous descriptions of emplacing the outer well pipe have featured a long pointed end. For subsalt penetration, it is desirable that the end of the outer well pipe be as short and flat as possible to facilitate its removal. Alternate designs which comprise certain aspects of each design in order to optimize performance may also be employed.

More specifically, once the outer well pipe has reached the bottom of the salt formation, the weights are removed, and it is fitted with an insulated pipe with open ends. This converts it into a double pipe heat exchanger as before. However, the object is not to remove energy efficiently by countercurrent flow down the annulus and up the inner pipe as it would be for the production of geothermal energy. Instead, it is required to cool the salt adjacent to the outer well pipe at the bottom of the formation as quickly and thoroughly as possible. This is the reason for the short flat end for this application. The cooling may be accomplished by cocurrent flow in which the coolant passes down the inner pipe and while still relatively unheated contacts the bottom of the outer well pipe before exiting through the annulus. After a sufficient volume of salt is cooled to ensure that it is too viscous to flow when the connection to the subsalt strata is being made, the cooling process is stopped, the inner insulated pipe is removed, and the outer well pipe filled with heavy brine or drilling mud. This is done to minimize the pressure difference between the inside of the outer well pipe and salt and minimize the driving force for the latter's encroachment during the next steps. Drilling equipment is then inserted into the outer well pipe and the closed end at its bottom drilled out. Drilling then continues into the subsalt strata for a distance equal to at least half a pipe section length. The drilling equipment is then withdrawn and a relatively close fitting pipe length (the largest diameter which will fit) dropped down the inside of the outer well pipe to the bottom and thus comes to rest with half its length in the hole drilled into the subsalt strata and half in the outer well pipe. Thus the dropped pipe may be longer than standard pipe section lengths, machined to fit, and possibly precooled so that upon warming at its destination a snugger fit is achieved. Measures are then taken to seal this pipe length to the subsalt strata (for example, by cementing) and to the outer well pipe (for example, by expanding its diameter with a tool) or by such other means as may be effective. When this is accomplished, drilling equipment (of somewhat smaller diameter than before which will fit inside this just added pipe length) is inserted and drilling through the subsalt strata to the required depths. When reached, the usual procedures for Hot Dry Rock apply.

The advantage of the combination of methods is that it allows the accessing of greater depths and temperatures at far less cost than would drilling alone.

BRIEF DESCRIPTION OF THE DRAWINGS

Preferred embodiments of the invention are described below with reference to the following accompanying drawings.

Geothermal Well Emplaced in a Salt Formation Used to Generate Electricity

Figure 2:
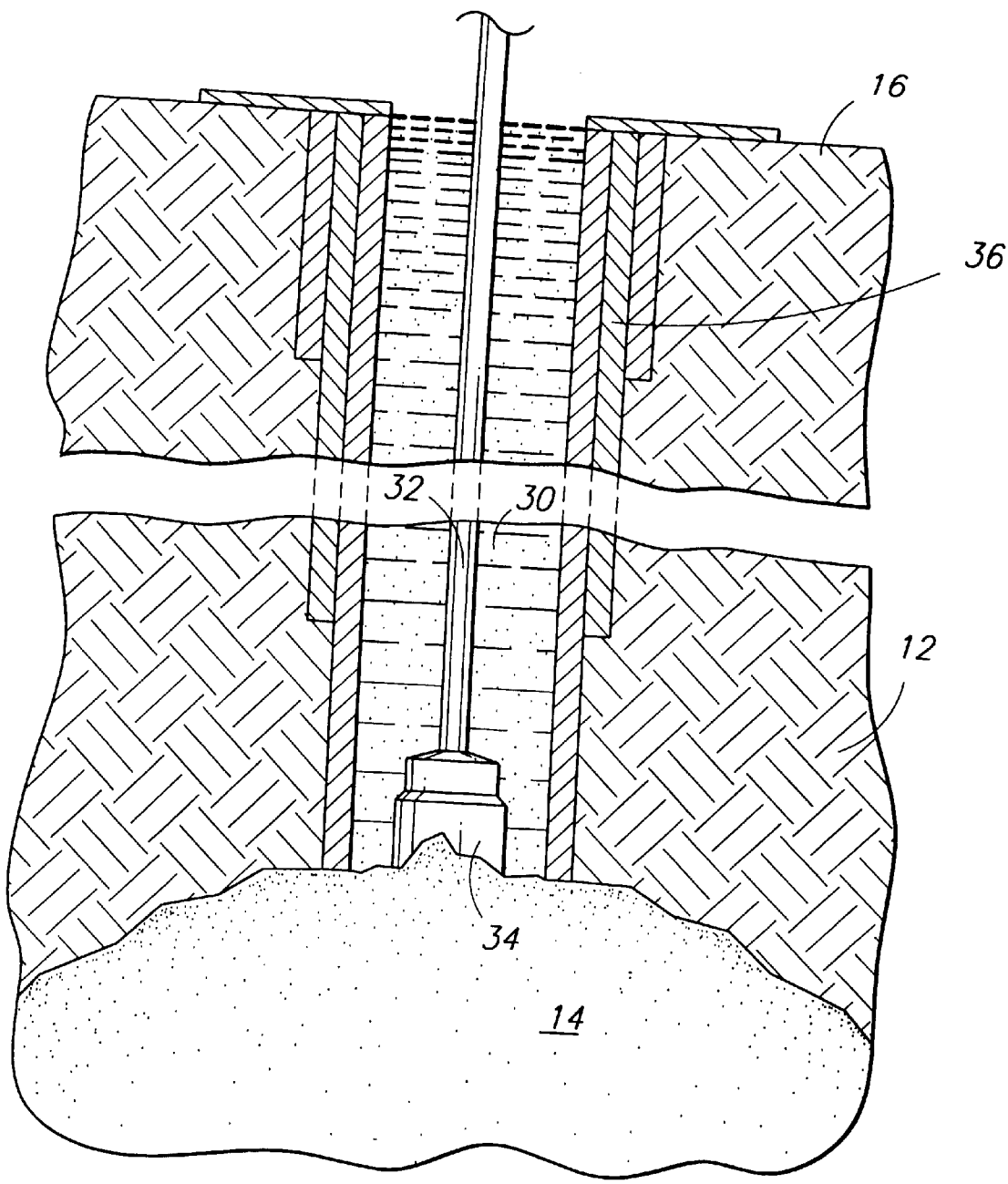
FIGS. 2–7 are vertical geological sectional views which sequentially depict the present invention's method of inserting a double pipe heat exchanger into a salt formation (here shown as a salt dome) where the salt when entered is sufficiently plastic to allow sinking.

Specifically:

FIG. 2 is a cross-sectional view illustrating the formation of a well shaft through the overburden.

Figure 3:
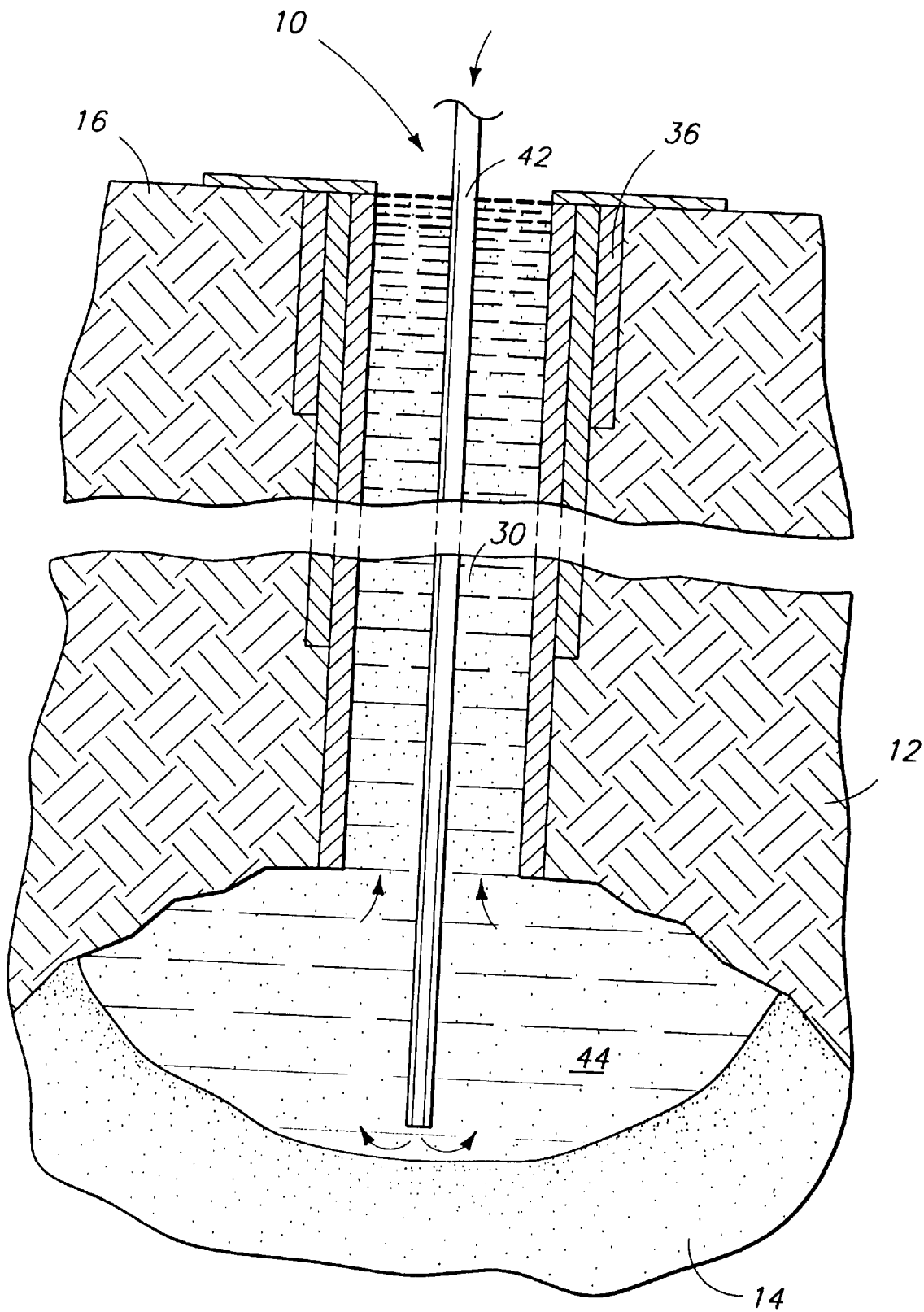

FIG. 3 is a cross-sectional view illustrating the formation of a cavern within an upper portion of a salt dome in accordance with the methods of the present invention.

Figure 4:
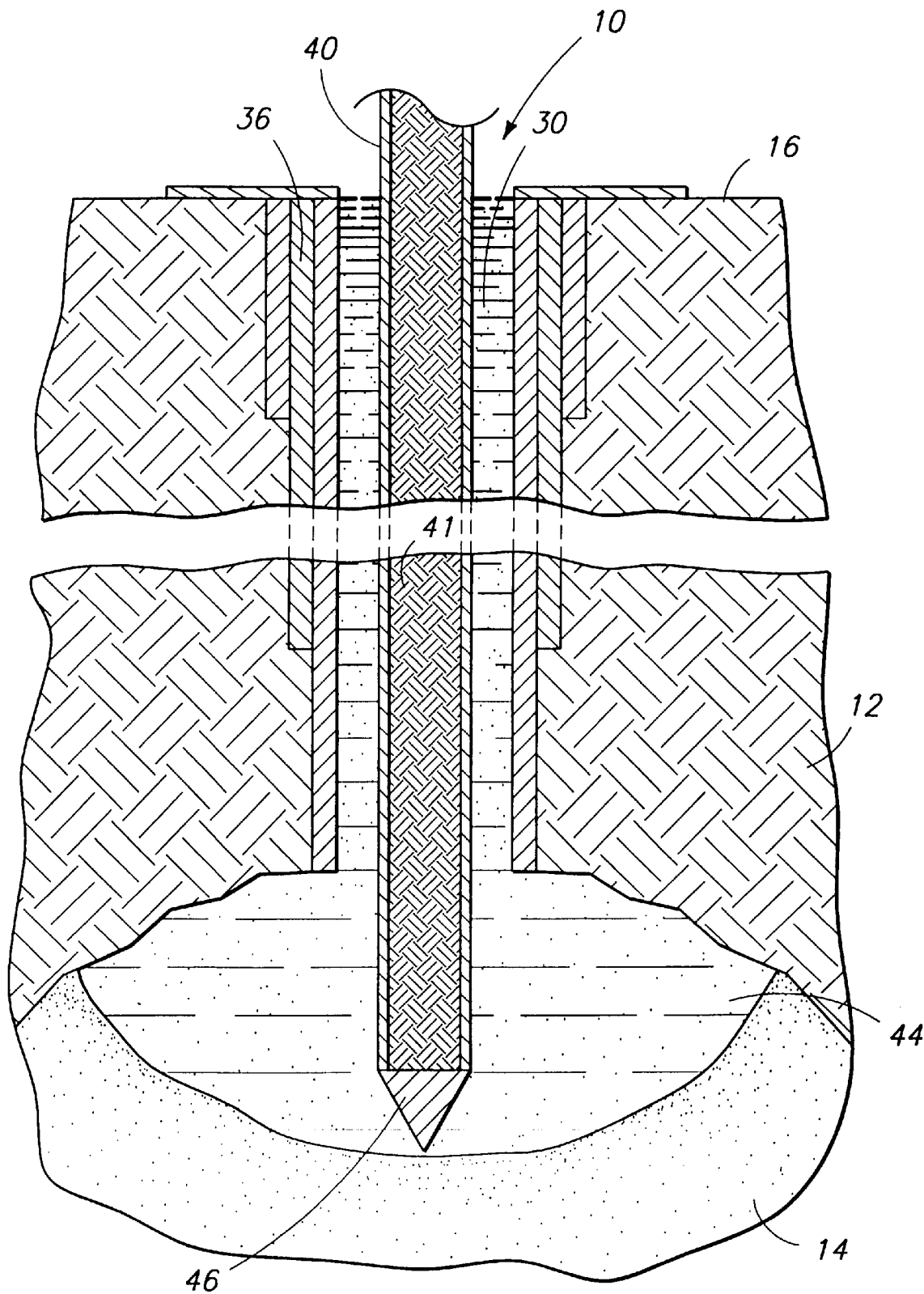

FIG. 4 is a cross-sectional view showing a well pipe inserted through the shaft into the cavern formed within the salt dome in accordance with one embodiment of the present invention.

Figure 5:
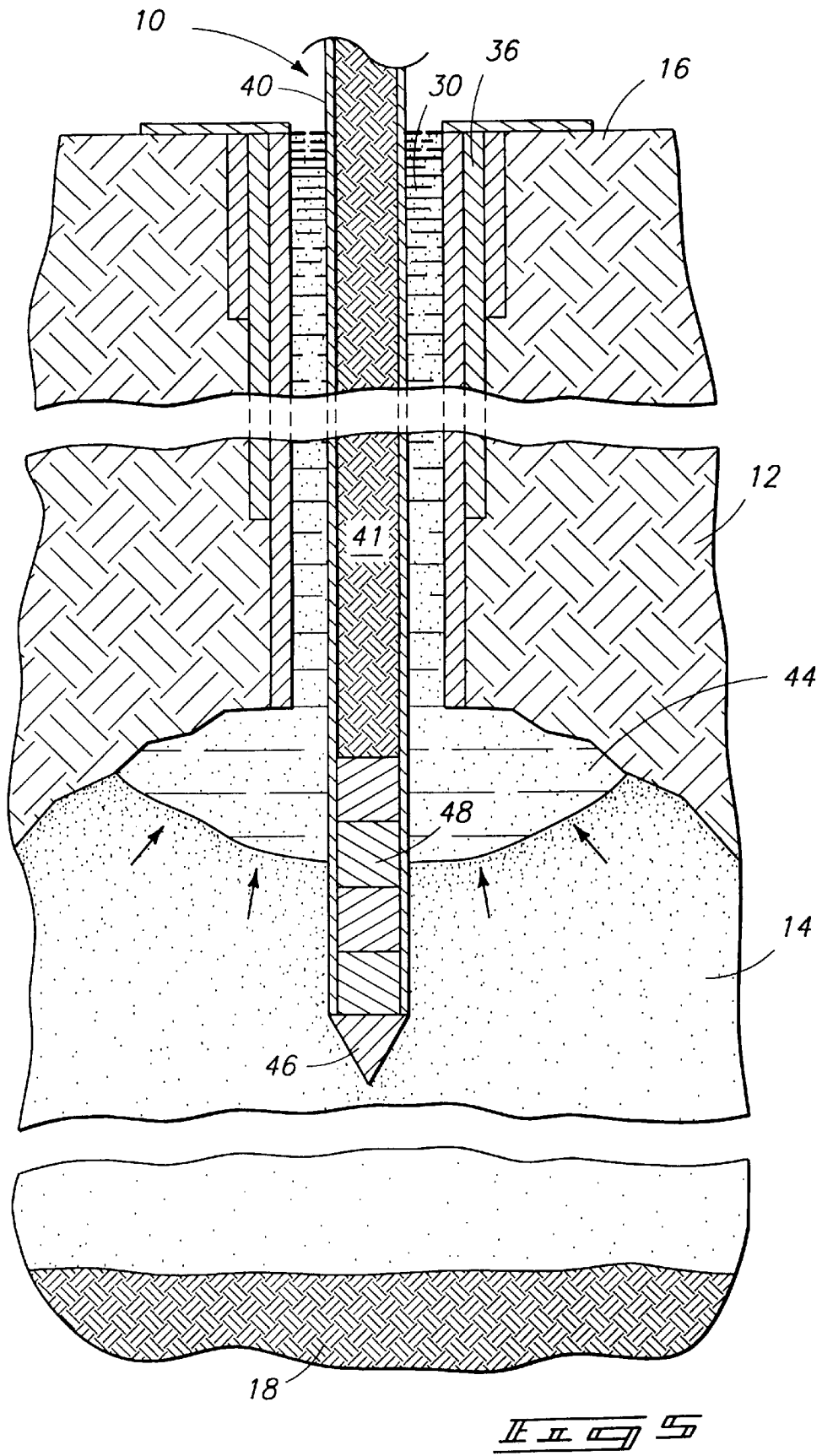

FIG. 5 is a cross-sectional view showing the well pipe sinking through plastic salt within the salt dome in accordance with the methods of the present invention.

Figure 6:
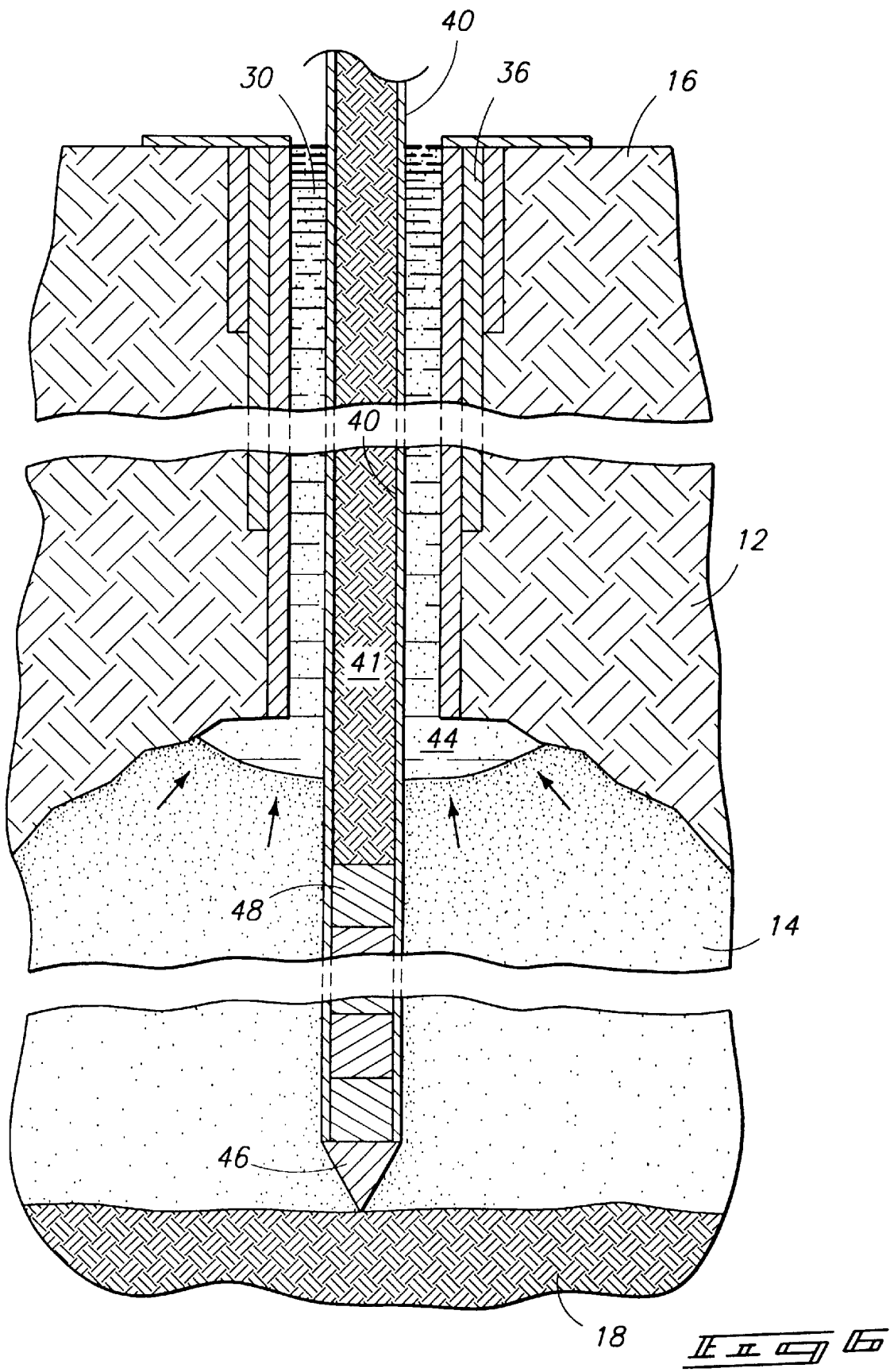

FIG. 6 is a cross-sectional view showing the well pipe contacting the underlying rock beneath the salt dome.

Figure 7:
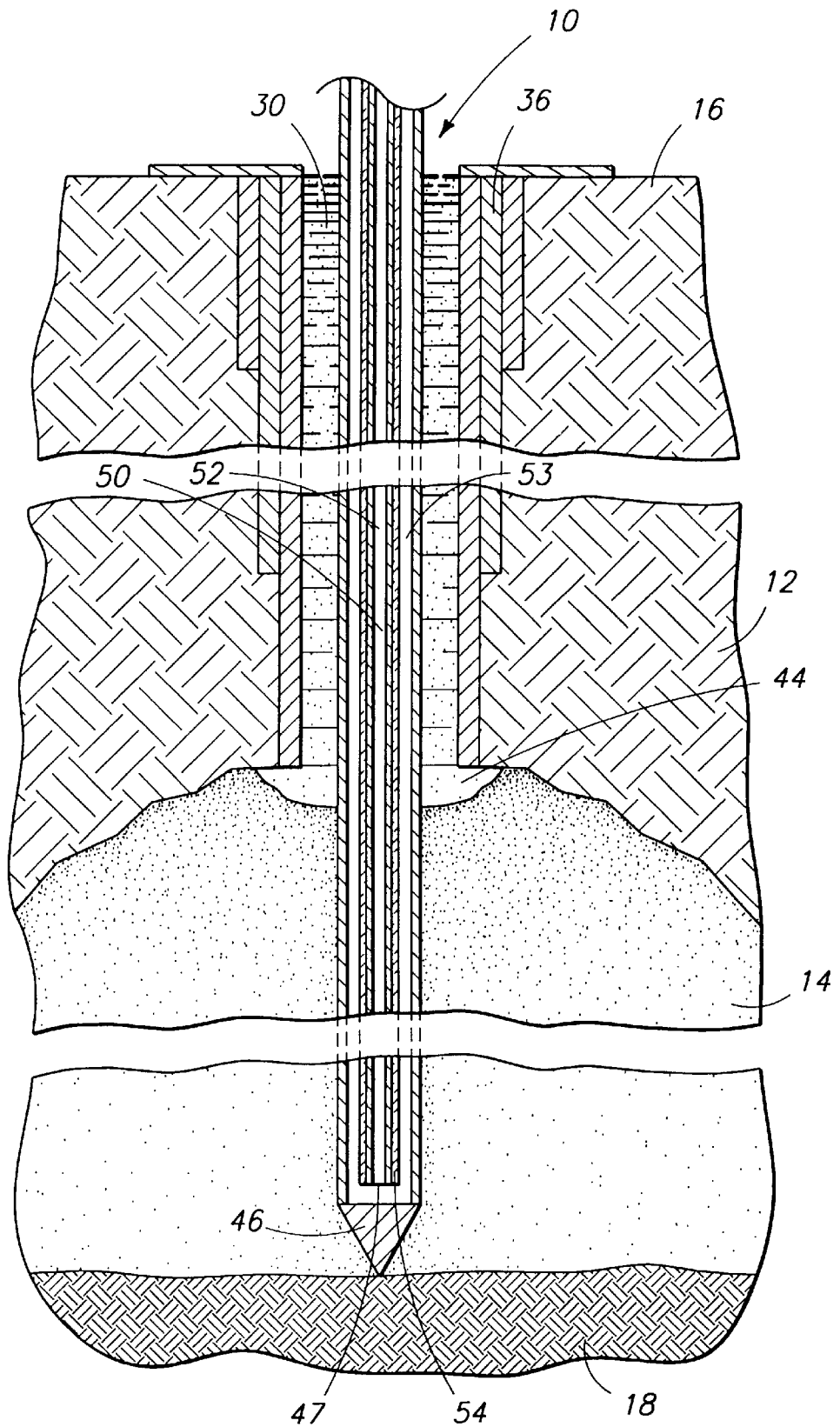

FIG. 7 is a cross-sectional view of the well pipe and insulated inner pipe converting a geothermal well into a double-pipe heat exchanger in accordance with the present invention.

FIGS. 8–11 and 15 are vertical geological sectional views which sequentially depict embodiments of the present invention's methods of inserting a double-pipe heat exchanger into a salt formation (again shown as a salt dome) where the salt when entered is not sufficiently plastic to allow sinking at an economically feasible rate and dissolving is used to reach sufficiently plastic salt.

Figure 8:
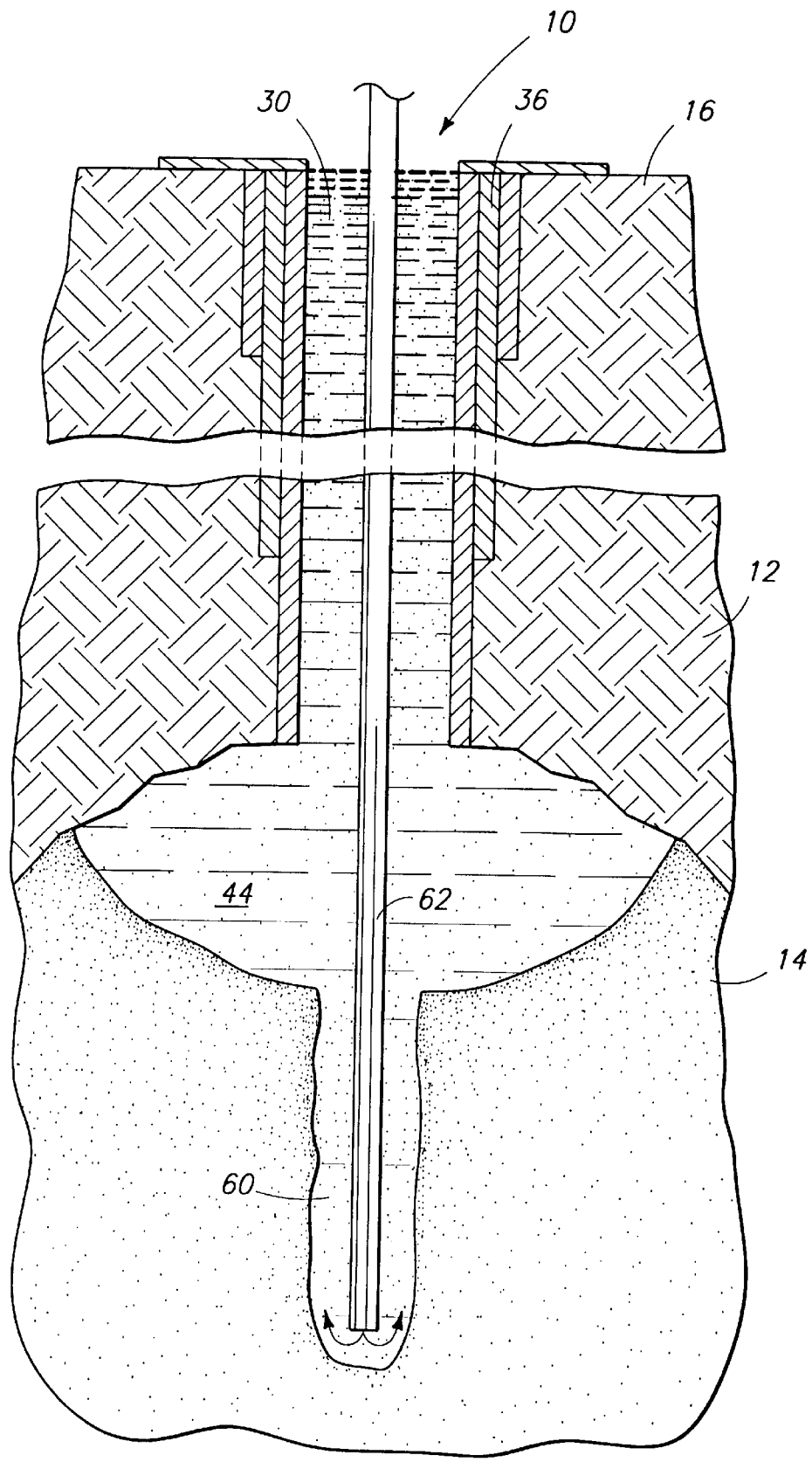

Specifically:

FIG. 8 is a cross-sectional view of the formation of an elongated chamber (i.e., a long, straight narrow hole) within the salt dome in accordance with an embodiment of the present invention.

Figure 9:
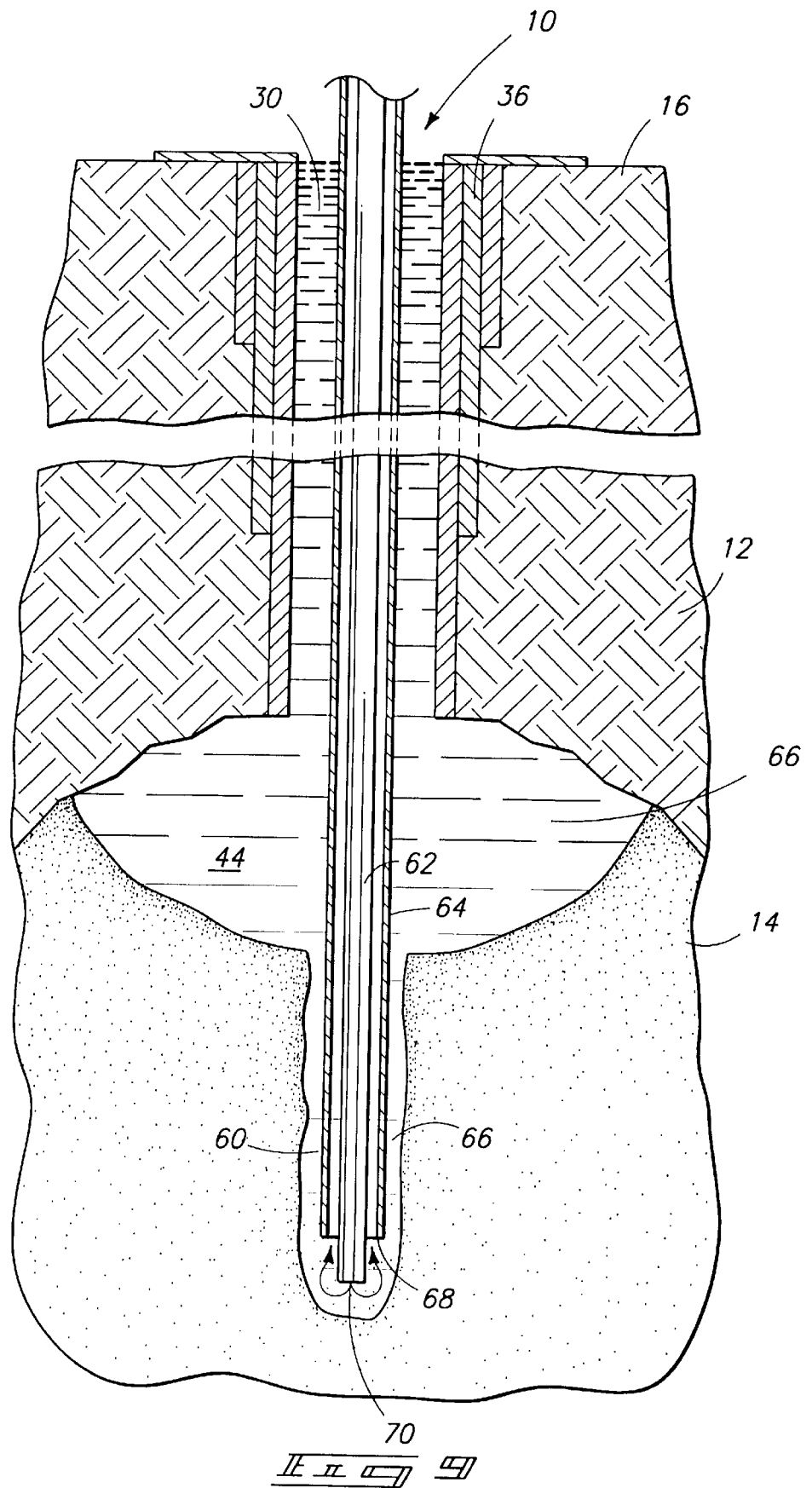

FIG. 9 is a cross-sectional view illustrating a method of forming the elongated chamber within the salt dome.

Figure 10:
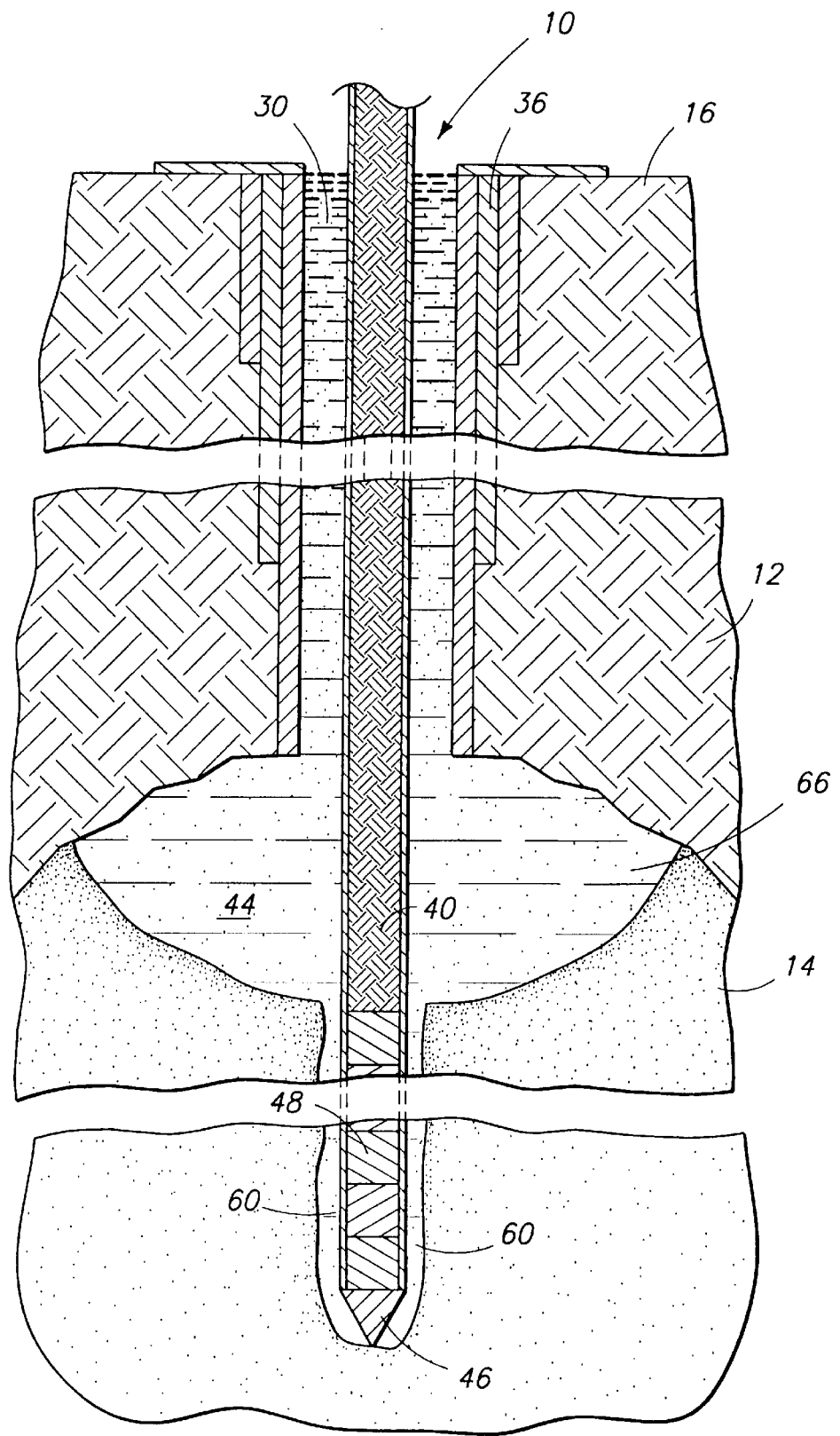

FIG. 10 is a cross-sectional view illustrating the well pipe passing through the cavern and elongated chamber and sinking through plastic salt within the salt dome.

Figure 11:
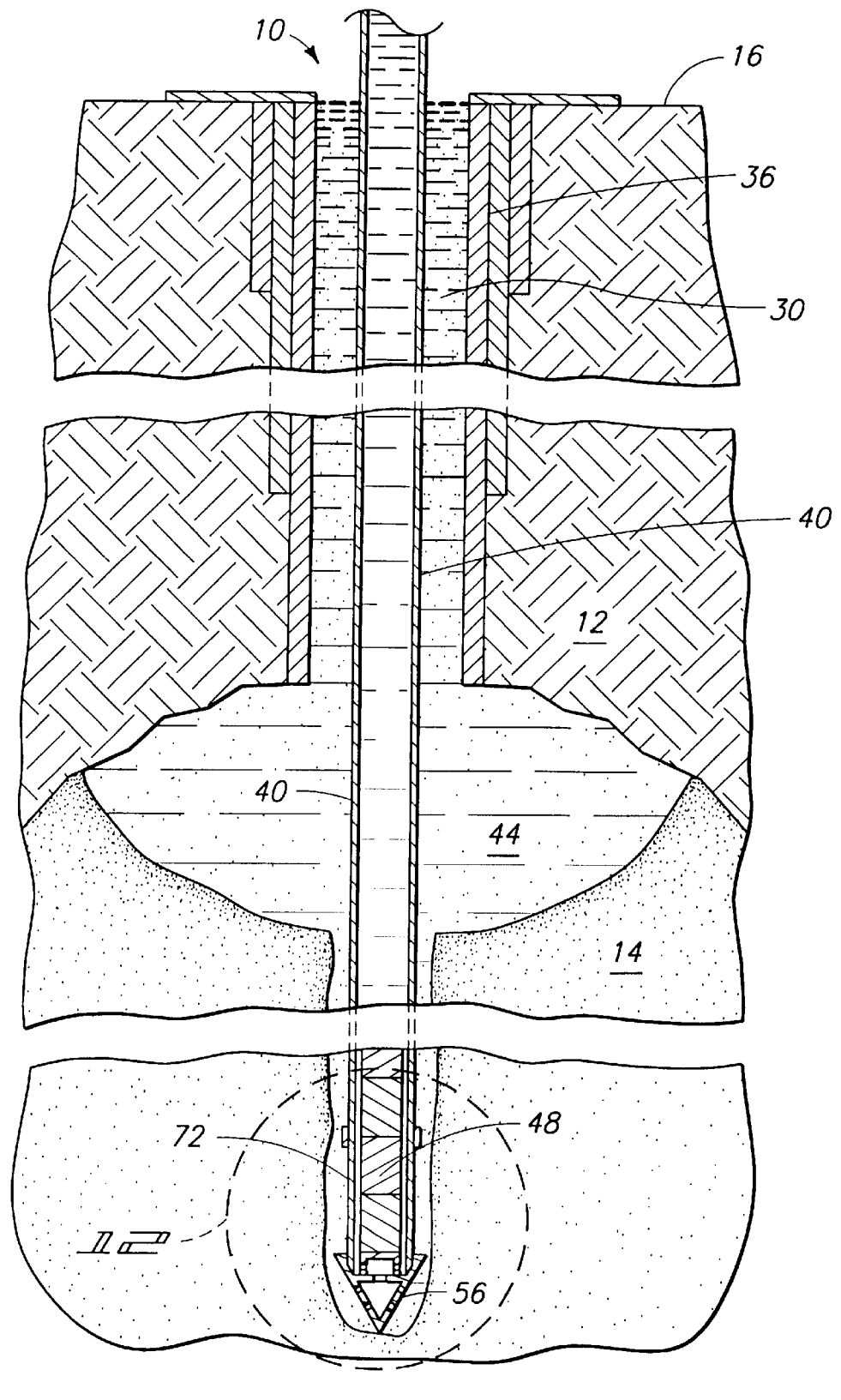

FIG. 11 is a cross-sectional view of a well pipe configured to dissolve a portion of the salt dome thereby creating the elongated chamber.

Figure 12:
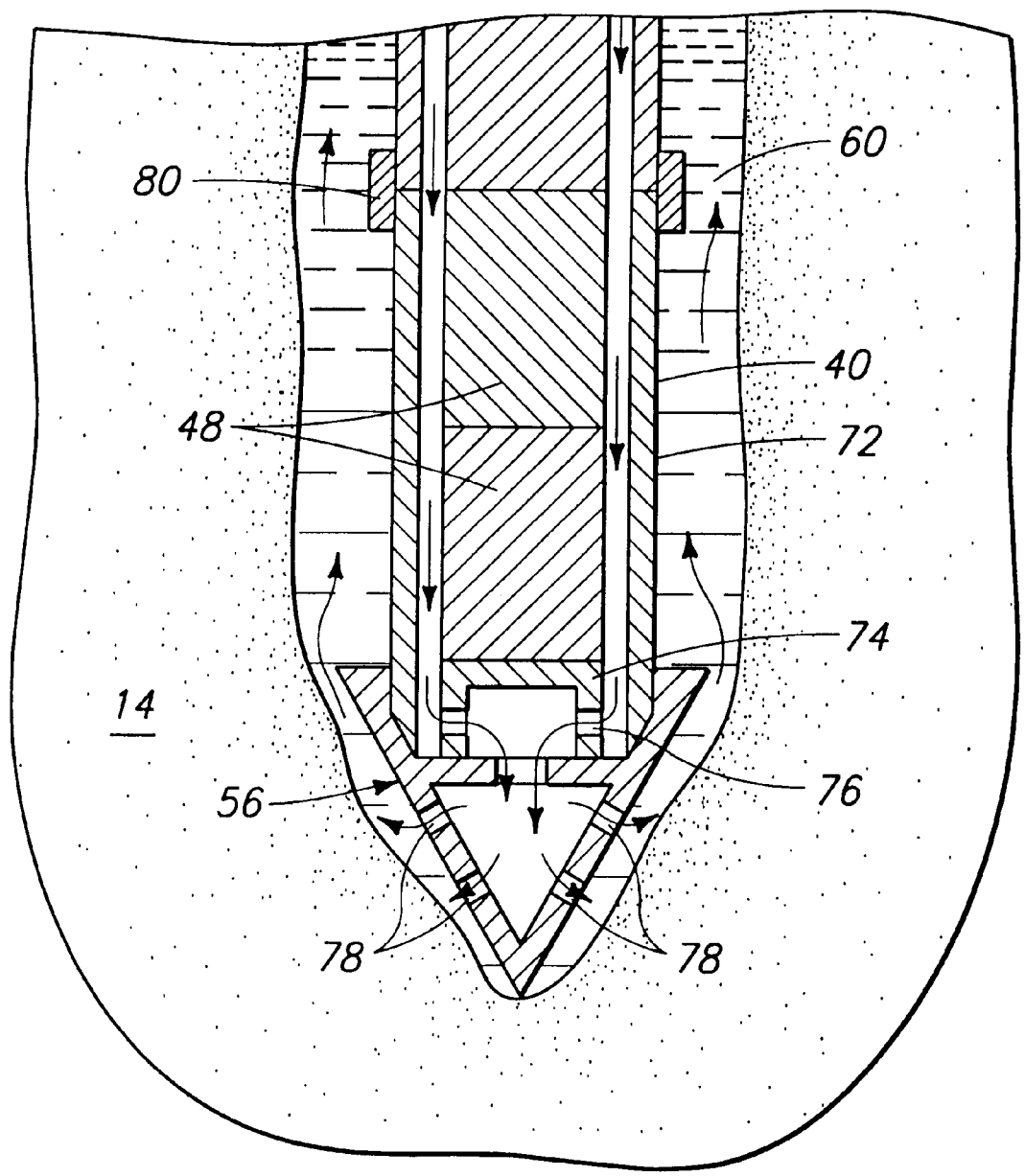
Figure 13:
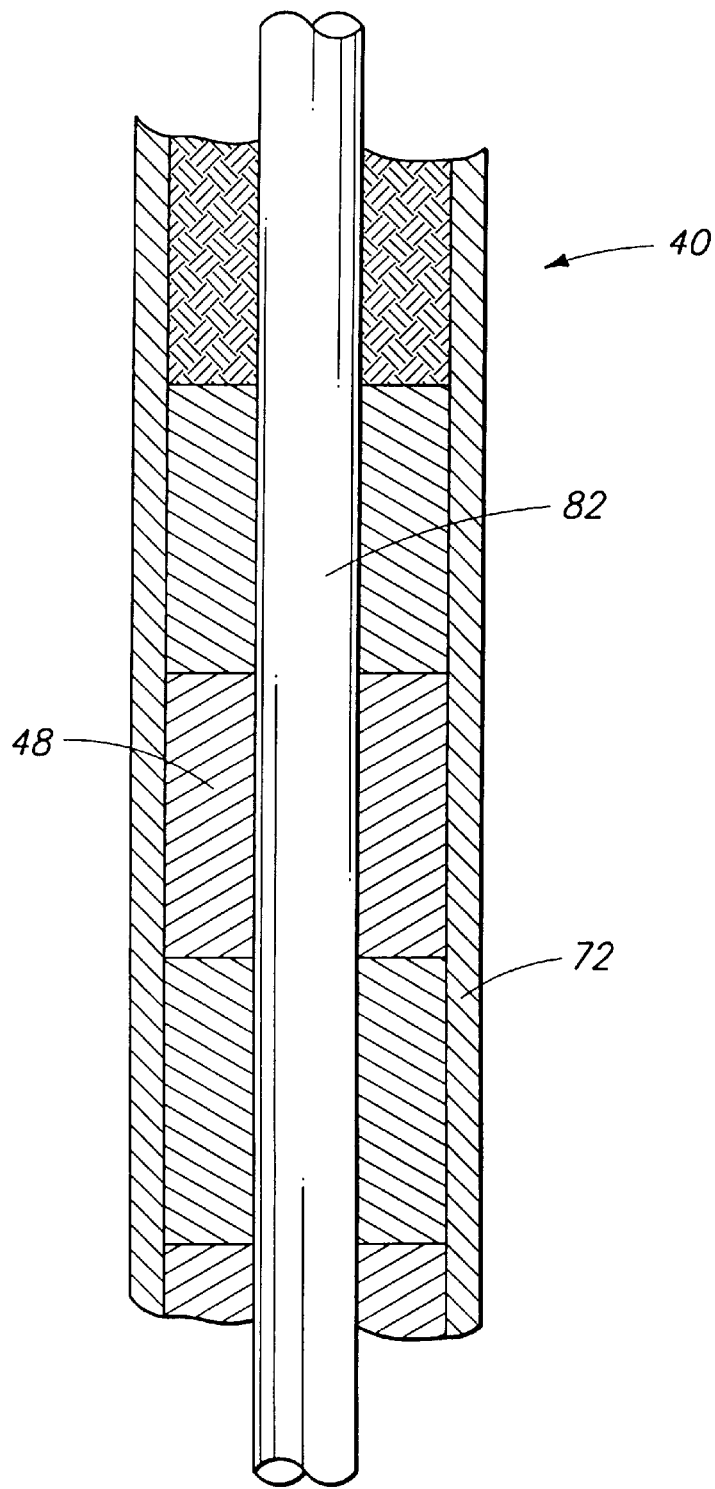
Figure 14:
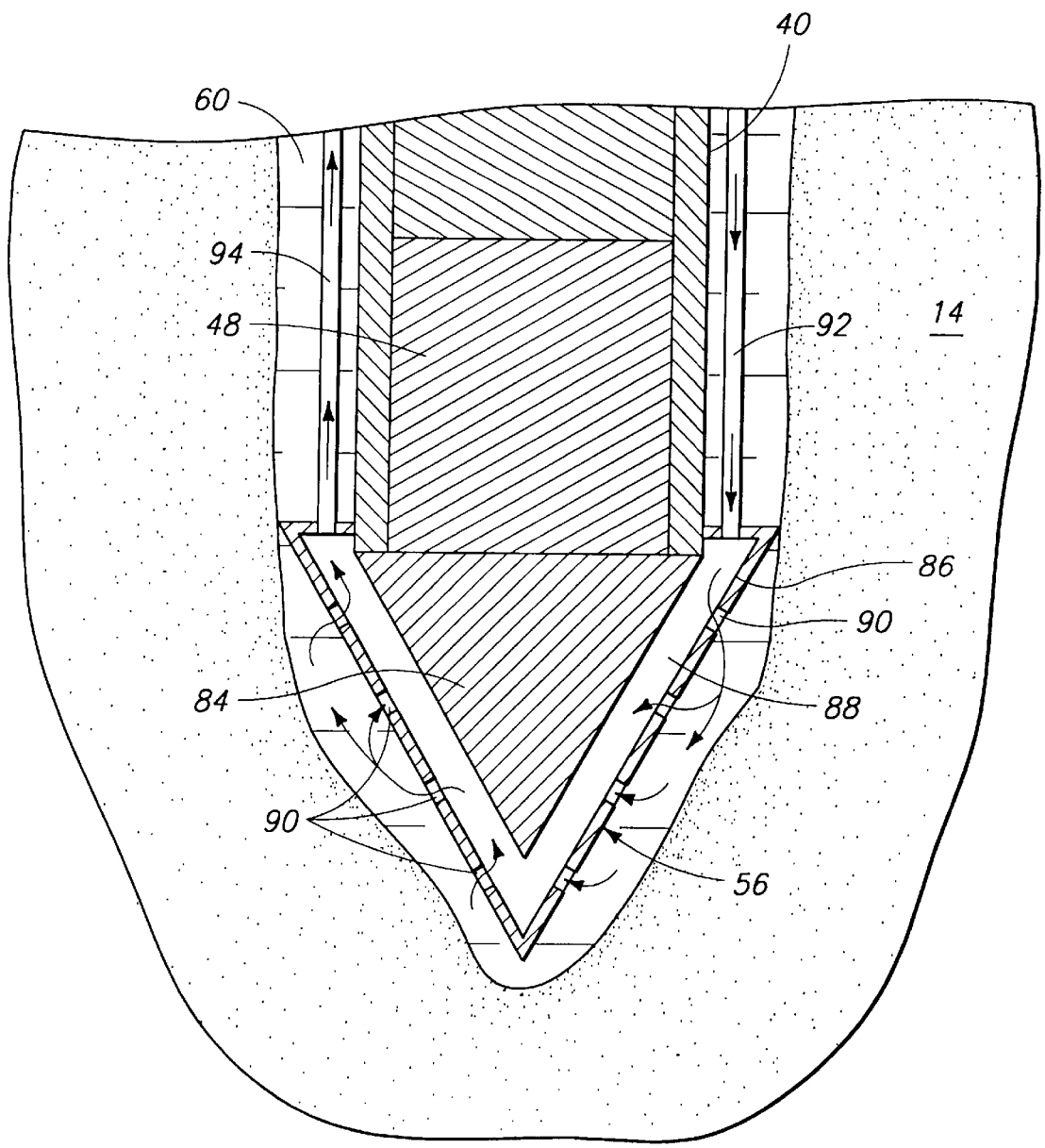

FIGS. 12–14 are cross-sectional views of various embodiments used to implement dissolving to reach salt hot and plastic enough to allow sinking and/or the bottom of the salt formation.

Specifically:

FIG. 12 is a cross-sectional view of an embodiment of a first end of the well pipe shown in FIG. 11 according to the present invention.

FIG. 13 is a cross-sectional view of an embodiment of the well pipe having a supply pipe within the interior thereof.

FIG. 14 is a cross-sectional view of an additional embodiment, a "dunce cap," of a first end of the well pipe shown in FIG. 11 according to the present invention.

Figure 15:
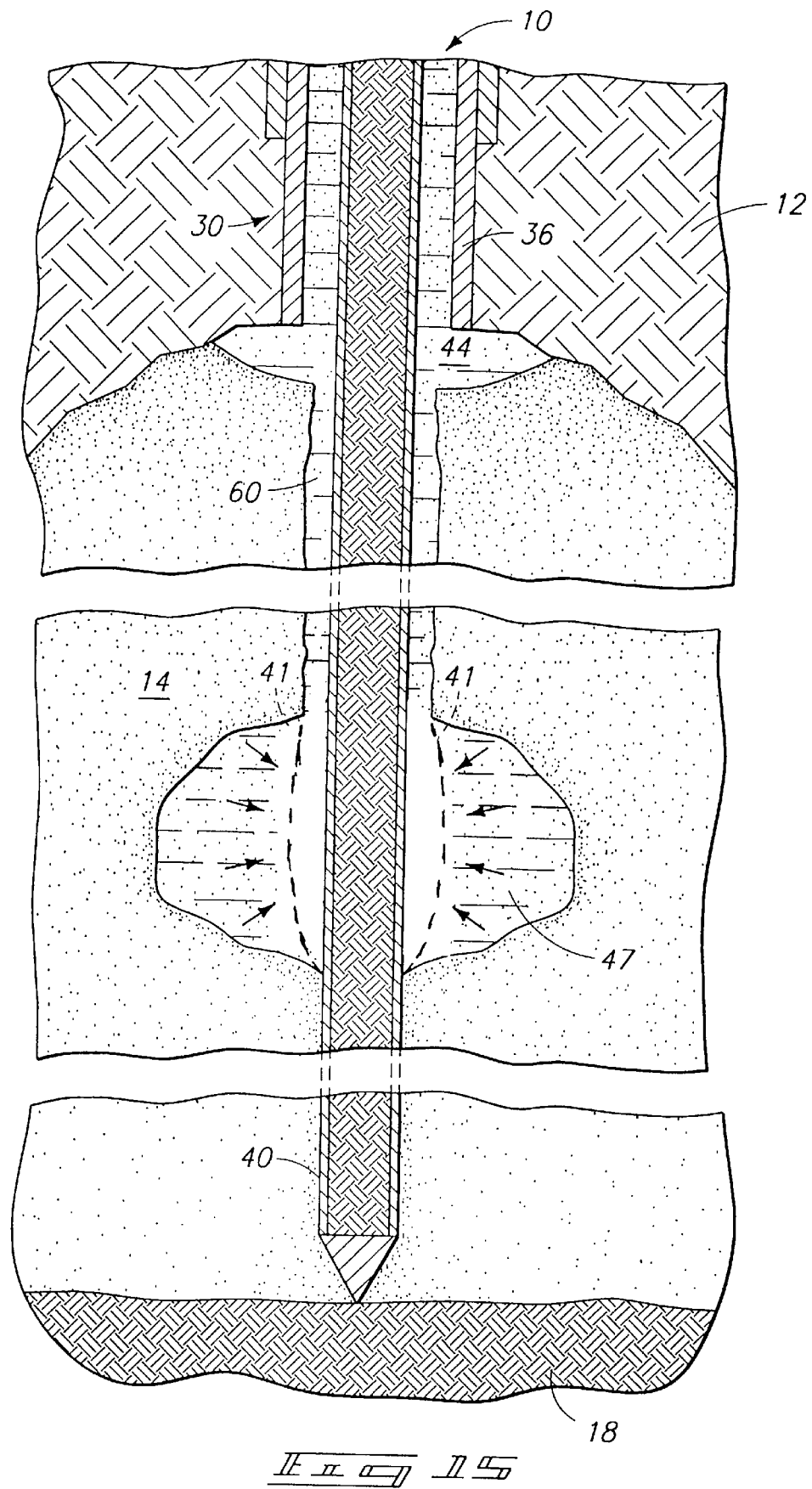

FIG. 15 is a cross-sectional view of a well installed within a salt dome in accordance with a method of the present invention.

FIGS. 16–19 are vertical geological sectional views which sequentially depict one embodiment of connecting the caisson such a well provides with the subsalt strata and converting two or more such wells into a Hot Dry Rock geothermal energy system.

Figure 16:
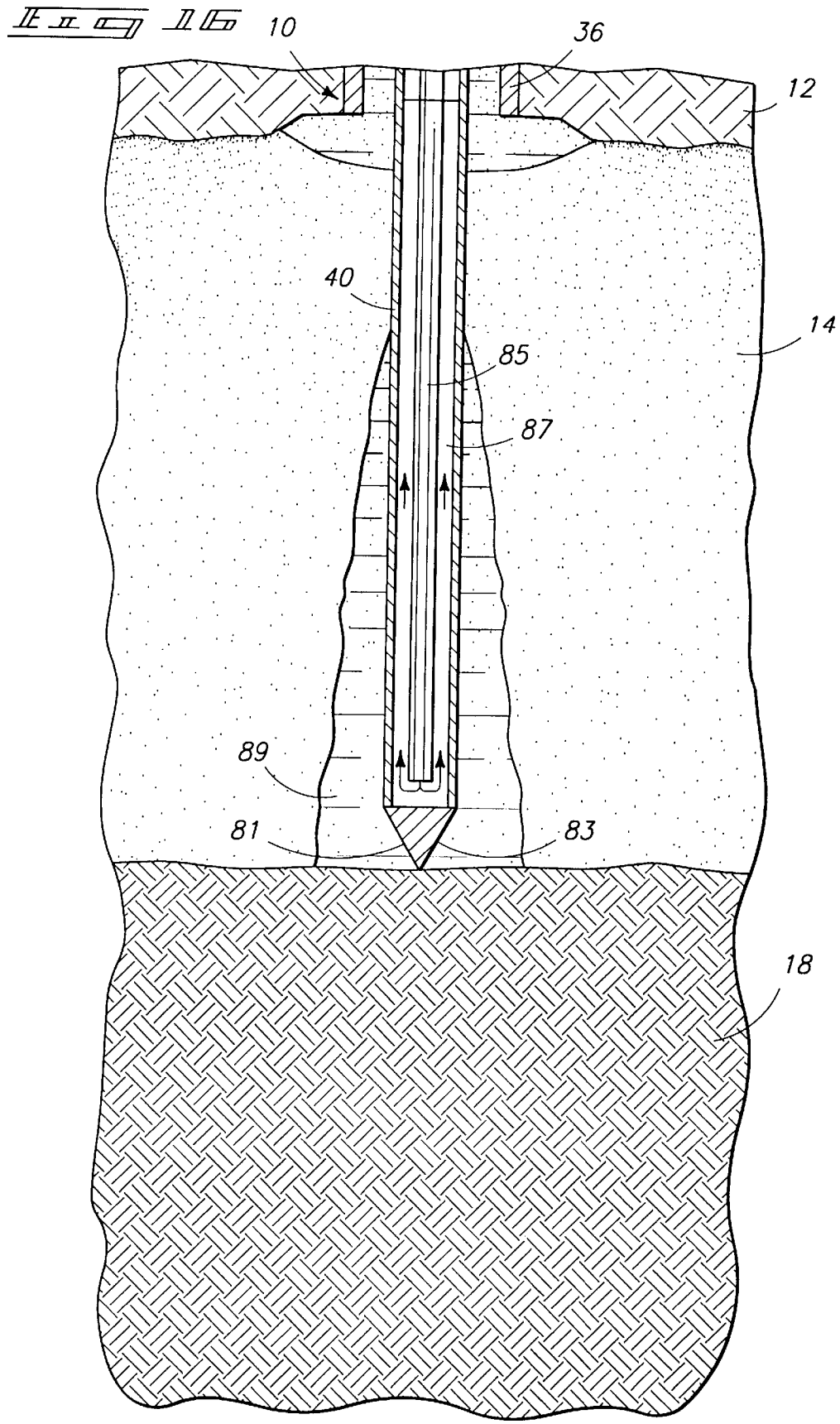

Specifically:

FIG. 16 is a cross-sectional view illustrating the cocurrent circulation of a cooling fluid within a well pipe following the emplacement thereof within a salt dome.

Figure 17:
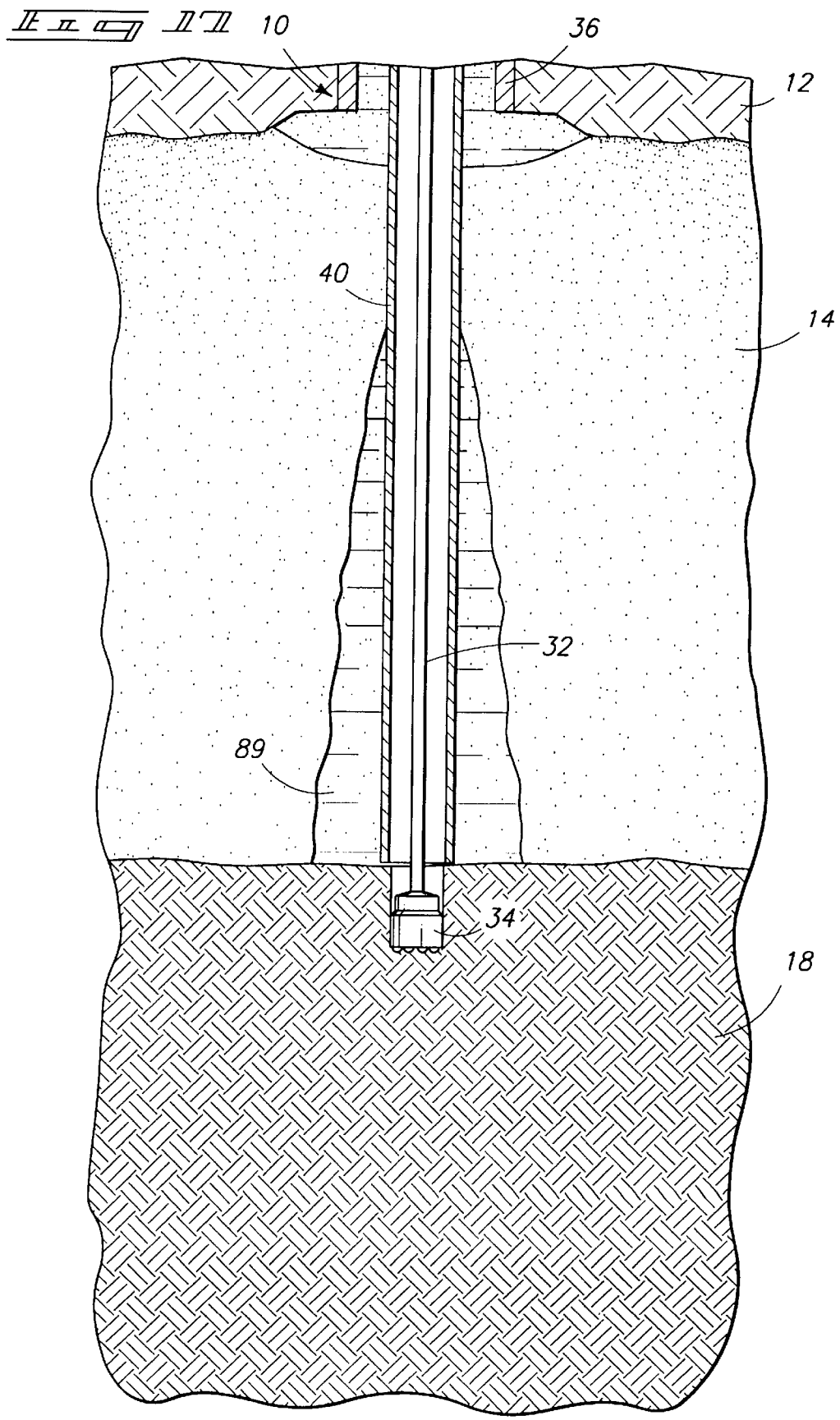

FIG. 17 is a cross-sectional view illustrating the formation of a shaft within the underlying rock beneath a salt dome.

Figure 18:
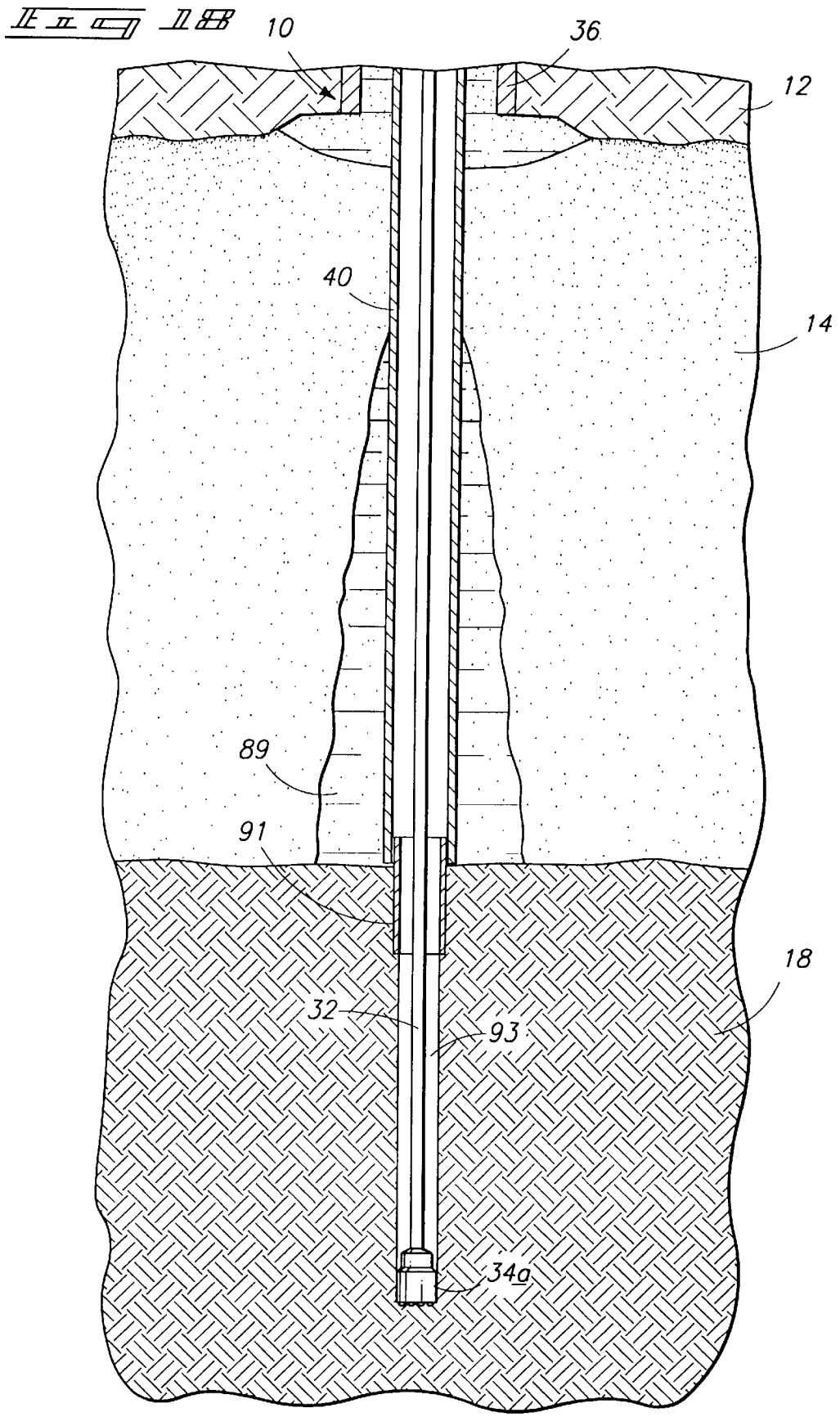

FIG. 18 is a cross-sectional view of the well extending through a salt dome and into the underlying rock.

FIG. 19 is a cross-sectional view of two adjacent wells which extend through a salt dome and into the underlying rock and are joined by hydraulic fracturing connections.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Overview

Preferred methods of installing a geothermal well in a subterranean formation in accordance with this invention are described with reference to FIG. 1–FIG. 19. Such figures show various aspects and characteristics described in detail below of the methods of installing a well in a subterranean formation. The figures are not drawn to scale but merely illustrate the methods in accordance with the present invention.

Figure 1:
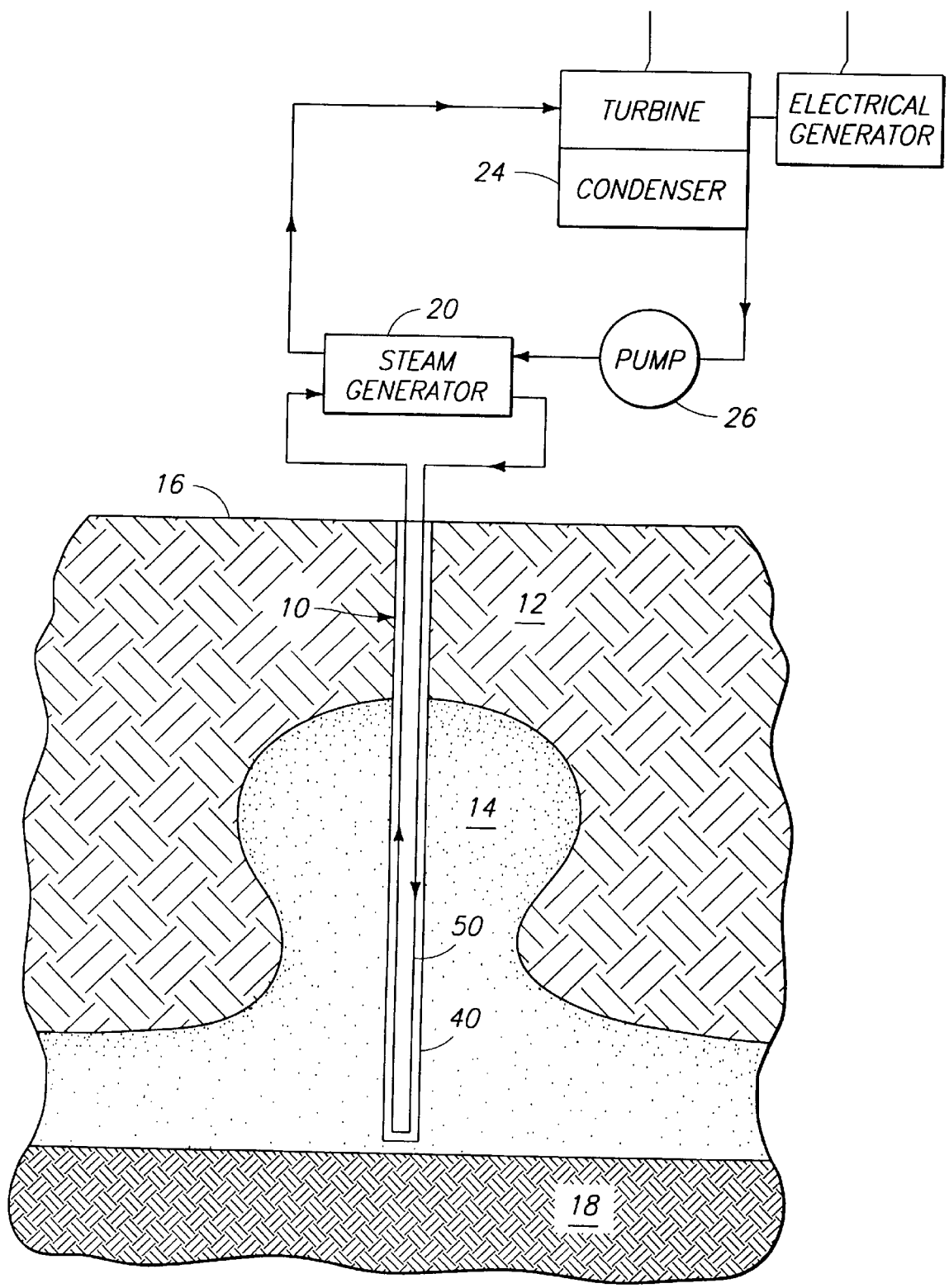
FIG. 1 is a diagrammatic illustration of a system which is the product of the methods proposed in this patent, a geothermal well within a salt dome powering an electric generator.

Referring to FIG. 1, a method of installing the well 10 within a subterranean formation in accordance with the present invention is shown. The subterranean formation generally includes a first subterranean material 12, also referred to as the overburden, and a second subterranean material 14, referred to as the salt dome. The first subterranean material 12 or overburden may comprise a plurality of subterranean materials such as sandstone, shale, etc. The subterranean formation may include a third subterranean material 18, referred to as the underlying rock or subsalt strata.

The well 10 is initially drilled through the first subterranean material 12. In accordance with an embodiment of the present invention, a well pipe 40 is extended through the first subterranean material 12 and the second subterranean material 14.

The well 10 is preferably extended through the salt dome 14 to a third subterranean material 18 (underlying rock). It is advantageous to have the heat-exchanger 50 extend to the lower portions of the salt dome 14 for maximum access to geothermal energy. A heat-transfer fluid, such as water, is circulated by natural convection or a pump (not shown) through the heat-exchanger 50. The fluid is heated as it passes through the length of the heat exchanger 50. The heated fluid returns to the top of the well 10 where it passes through a steam generator 20, where it boils another liquid to produce steam to drive turbine 22, connected to electrical generator 23 which produces electricity. The steam from turbine 22 is subsequently condensed within a condenser 24 and pressurized by pump 26 sufficiently to be returned to the steam generator.

I. Well Installation In Deep and the Deeper Intermediate Salt Domes

The geothermal well 10 is preferably installed within a deep or deeper intermediate salt dome 14. As described above, the salt at the top of such salt domes is expected to be sufficiently plastic to allow sinking at an economically feasible rate. One method in accordance with the present invention of installing a geothermal well 10 within deep and deeper intermediate salt domes 14 is described herein with reference to FIG. 2–FIG. 7.

Brief Description of Method

In this first embodiment of the invention, which is described in more detail below, a traditional well is drilled and cased down to the top of the salt dome. A water pipe is then inserted into the well and a portion of the top of the salt dome is dissolved by injecting water down the water pipe where it will contact and dissolve the salt. The resulting brine can either be extracted or remain in the resulting cavern. The amount of the salt dissolved should be equal to the volume of a desired well between the top of the salt dome and the bottom of the salt dome plus an allowance for contingencies.

Once the desired cavern has been formed in the top of the salt dome the water pipe is removed and a well pipe is inserted into the well. The well pipe is preferably a pipe with a closed end, more preferably having a pointed closed end. The well pipe is preferably weighted with a heavy liquid and/or solid weights. In either case, the weighting material should be susceptible of being removed with the well pipe in the well bore. Once the well pipe has been placed in the well bore against the salt, it is allowed to sink into the salt. Since the salt is plastic, the weighted well pipe will sink into the salt. The salt displaced by the sinking well pipe will push up the salt around the descending well pipe, thus filling the cavern formed at the top of the salt dome. The cavern thus provides a place for the displaced salt to go. Without the cavern, the displaced salt would need to overcome the stress of the overburden and force up the surrounding surface rock, an unlikely event. Alternately, the displaced salt would need to compress the surrounding rock, an equally unlikely event. Either of these alternatives would make further sinking difficult if not impossible.

Once the well pipe has come to rest, preferably at the bottom of the salt dome against the underlying rock, the weighting material (if any) is removed from the well pipe, and an insulated pipe with open ends is placed therein converting the combination into a double-pipe heat exchanger. The heat exchanger preferably extends to the lowermost portion of the salt dome where the salt temperature and thus the geothermal energy is greatest. A heat transfer fluid may then be circulated within the heat exchanger to extract geothermal energy from the Earth.

The above method will now be described more fully with respect to the accompanying figures.

a) Forming a Well to the Top of the Salt Dome.

First, an upper shaft 30 of the well 10 is drilled through the first subterranean material (overburden) 12 down to the upper portion of the salt dome 14 by a conventional drilling stem 32 and drilling tool 34. Casing 36 is thereafter formed about the periphery of the upper shaft 30. Such drilling and casing of the upper shaft 30 is performed by conventional means. The upper shaft 30 preferably remains filled with brine or drilling mud.

b) Forming a Cavern in the Top of the Salt Dome.

After the formation and casing of the upper shaft 30, the drilling stem 32 and drilling tool 34 are removed from the well 10. Next, it is preferred to dissolve a portion of the second subterranean material 14 (salt dome) thereby improving the insertability of the well pipe 40 into the salt dome 14.

Referring to FIG. 3, a water pipe 42 is inserted into the upper shaft 30. A first fluid, such as water or other suitable solution, is pumped through the water pipe 42 to the top of the salt dome 14. The first fluid dissolves a portion of the salt dome 14. Subsequently, an upper cavern 44 is formed within the salt dome 14 adjacent the upper shaft 30 of the well 10. The volume of the cavern 44 formed within the salt dome 14 is chosen to approximate the volume of the second subterranean material displaced when the well pipe 40 is inserted through the salt dome 14 (see FIG. 5) plus an allowance for contingencies.

The well pipe 40 preferably has a relatively small diameter since the heat transferred per unit of cylinder height per unit temperature difference increases as the radius decreases and the cost of the well decreases as the radius decreases.

The cavern 44 shape is generally hemispherical as shown in FIG. 3 to avoid pinching the entrance to the upper shaft 30 which may freeze the well pipe 40 (shown in FIG. 4) therein. The cavern 44 radius will typically be on the order of about 9 to 17 meters (30 feet to 50 feet) depending upon the diameter of the well pipe 40 and depth of the salt dome 14. The cavern 44 is preferably filled with drilling mud or heavy brine which may be pumped into the cavern 44 through the upper shaft 30 or made in-situ when dissolving the cavern.

c) Placing the Well Pipe in the Salt Dome.

Following the formation and filling of the cavern 44, the water pipe 42 and other dissolving equipment is withdrawn from the well 10. As shown in FIG. 4, a well pipe 40 is inserted through the upper shaft 30 into the cavern 44. One embodiment of the well pipe 40 preferably includes an elongated tube having a closed first end 46. The first end 46 is conical to form a point for improving the movability of the well pipe 40 through the salt dome 14. The well pipe 40 is preferably filled with a fluid 41, such as water or heavy brine, to counteract the crushing forces imposed upon the well pipe 40.

The well pipe 40 shown in FIG. 4 has been placed in a position adjacent the undissolved portion of the salt dome 14. Weights 48 may be inserted into the well pipe 40 as shown in FIG. 5. Referring to FIG. 5, the weighted well pipe 40 begins to sink through the plastic salt dome 14. The solid first end 46 holds the weights 48 within the well pipe 40 and gravity pulls the well pipe 40 through the plastic salt dome 14. As represented by the arrows shown in FIG. 5, the displaced plastic salt occupies the cavern 44 thereby reducing the size of the cavern 44 as the well pipe 40 passes through the salt dome 14. Reducing the size of the cavern 44 forces the brine therein through the annulus between the well pipe 40 and the casing 36. The brine rises to the surface 16 and out of the top of the well 10.

Turning now to FIG. 6, the well pipe 40 preferably sinks through the entire salt dome 14 to the layer of underlying rock 18 therebelow. The first end 46 of the well pipe 10 rests upon the underlying rock 18. As shown in FIG. 6, the volume of the cavern 44 has been substantially reduced as a result of the well pipe 40 displacing the salt which is the second subterranean material 14. As a result of the method of sinking the well, the well pipe 40 is preferably in intimate contact with the salt dome 14 thereby improving the exchange of heat therebetween.

d) Placing a Heat Exchanger in the Well Pipe.

The weights 48 are preferably unloaded from the well pipe 40 once it has come to rest upon the underlying rock 18 or has otherwise reached the desired depth. An insulated pipe 54 with open ends 52 is subsequently inserted into the hollow well pipe 40 forming a double pipe heat-exchanger 50 as shown in FIG. 7.

e) Operating the Heat Exchanger to Extract Geothermal Energy.

A working or heat-transfer fluid is inserted into the well pipe 40. In particular, the heat-transfer fluid is pumped into an annulus 53 within the well pipe 40 intermediate the insulation 54 and inner surface of the wall of the well pipe 40. The heat-transfer fluid prevents collapse of the well pipe 40 from the forces due to the weight of the overburden 12 and salt dome 14. The heat-transfer fluid preferably provides a high heat capacity per unit volume.

The temperature of the heat-transfer fluid increases as it passes downward through the annulus 53. The heat from the salt dome 14 increases the temperature of the exterior of the well pipe 40 which conducts the heat to the heat-transfer fluid. An opening exists at a first end 47 of the heat-exchanger pipe 52 permitting the heat transfer fluid to enter the heat-exchanger pipe 52 therethrough. A pump (not shown) may be placed at the entrance of the annulus 53 to assist the flow of the heat-transfer fluid. Thereafter, the heated heat-transfer fluid may be applied to the steam generator 20 and turbine 22 of FIG. 1 for generating electricity.

Should the heat transfer fluid be at a temperature above its critical temperature, it could be passed directly to a turbine thus omitting the steam generator (heat exchanger) and the use of a binary fluid. Alternatively, the working fluid emerging from the well as a liquid could be passed to one or more flash chambers, the steam from which could pass directly to a turbine and the liquid be used with a steam generator and binary fluid as is the practice in the geothermal industry.

II. Well Installation In Shallow and Intermediate Salt Domes

The present invention also provides a method for installing geothermal wells 10 within shallow and intermediate salt domes 14. Providing a method for installing a well 10 within shallow and intermediate salt domes 14 is advantageous inasmuch as deep salt domes represent a small fraction of the total number of salt domes 14.

The top of the salt of such shallow and intermediate salt domes 14 is typically between 2,000 to 8,000 feet below the surface 16 of the Earth. The installation of the geothermal well 10 within a shallow or intermediate salt dome 14 is preferred because less drilling through the overburden 12 is required to reach the salt.

The top of a shallow or intermediate salt dome lies closer to the Earth's surface 16 than the top of deep salt domes (i.e., the overburden is deeper above a deep salt dome). Therefore, the overburden 12 above a shallow or intermediate salt dome 14 provides less insulation resulting in lower temperatures at the upper portion of the salt dome. More specifically, the temperature at the top of the salt dome 14 is typically less than 400° F. and the salt is not sufficiently plastic to allow sinking at an economically feasible rate when the dome is entered.

Brief Description of Method

In this second embodiment, a well bore is formed through the overlying rock to the top of the salt dome, as previously described. A cavern may be formed in the top of the salt dome in the manner previously described to keep any plastic behavior of the salt from blocking the well bore. Inasmuch as the salt in the upper portion of these shallow and intermediate domes is not sufficiently plastic to allow economically feasible sinking rates to use the method of the first embodiment of the invention, the sufficiently plastic portion of the salt dome must be accessed. This may be accomplished in at least two different ways.

First, the salt may be drilled out in a conventional manner down to the desired region. This is a less preferred method due to the cost of drilling. Preferably, a deep, small diameter hole is dissolved through the less plastic portion of the salt. This is accomplished by inserting a water pipe in the well bore and dissolving the salt. In order to prevent excessive dissolution of the salt (resulting in a well that is larger in diameter than desired), an oil pad may be provided which extends almost down to the outlet of the water pipe. As water is injected into the well to dissolve the salt, the oil will float above the water, thus preventing water from contacting (and dissolving) salt in the upper regions of the well. A brine extraction pipe is preferably used to remove the dissolved salt when an oil pad is employed.

Once the plastic salt has been accessed by the elongated hole, a well pipe may be inserted into the hole and "sunk" through the salt in the manner described in the first embodiment. However, as the displaced salt will need somewhere to go, it is preferable to first form a secondary cavern at the top of the plastic region similar to the manner described for the first embodiment. The displaced salt (from the sinking well pipe) will push up and fill the secondary cavern. Once the well pipe is in place, it is converted into a double-pipe heat exchanger as described previously.

As an alternative to sinking the well pipe using weights or the like, the elongated chamber (described above) may continue to be formed after reaching the plastic salt region. The elongated chamber may be formed within the salt all the way to the bottom of the salt dome, or as far as desired within the salt. A combination of dissolving an elongated chamber and sinking the well pipe in the manner previously described may also be employed. Once the well pipe is inserted, it is converted into a double-pipe heat exchanger as described previously.

The above method will now be described more fully with respect to the accompanying figures.

a) Forming a Well to the Top of the Salt Dome; Forming a First Cavern in the Top of the Salt Dome.

The present invention provides for a method of installing a well 10 within shallow and intermediate salt domes 14. Referring to FIG. 8, the shaft 30 may be formed through the overburden 12 and the cavern 44 may be formed within the salt dome 14 in accordance with the methods previously discussed above. The formation of the cavern 44 is advantageous to prevent binding in the event plastic behavior exists during the remaining formation of the well 10 and insertion of the well pipe 40. The volume of this "nonbinding" cavern may be appreciably smaller than in the first embodiment, since provision for the volume of the outer well pipe 40 can be made later.

b) Forming an Elongated Chamber to the Plastic Salt.

Thereafter, an elongated chamber 60 may be formed within the salt dome 14 providing access to hotter salt which is sufficiently plastic. Providing access to such salt permits sinking of the well pipe 40 through the remaining depth of the salt dome 14. It is expected that a distance of approximately 10,000 feet from the upper surface of the salt dome 14 to the interior thereof should typically reach temperatures between 400 and 540° F. where the salt may be sufficiently plastic. The elongated chamber 60 preferably has a length between 5,000 and 10,000 feet and a diameter between 1 to 2 feet.

An inlet pipe 62 is used to provide a first fluid, such as water, to dissolve the elongated chamber 60. The water dissolves a portion of the salt dome 14 thereby filling the elongated chamber 60 and cavern 44 with brine. The brine may subsequently overflow at the surface of the well 10.

Alternatively, as shown in FIG. 9, an outlet pipe 64 may be utilized adjacent or (as shown) concentric with the inlet pipe 62 to remove the brine within the elongated chamber 60 of the salt dome 14. The inlet pipe 62 and outlet pipe 64 are filled with water and brine, respectively. A pump (not shown) coupled with the inlet pipe 62 must be able to develop a sufficient pressure to provide adequate flow and overcome the differential pressure due to the differences in density of the fluid within the respective pipes 62 and 64. It is preferred to dissolve the minimum amount of salt required thereby reducing costs.

In order to prevent more salt than is desired from being dissolved from the chamber diameter, the dissolved volume of the salt dome 14 is filled with a second fluid 66, comprising oil or other liquid, which will float above water and will not dissolve salt, to provide directional dissolution. "Directional dissolution" is defined as dissolving salt in a preselected direction, rather than general volumetric salt dissolution. Filling the dissolved volume with oil or other hydrocarbon liquid 66 further minimizes the amount of salt dissolved during the formation of the elongated chamber 60 and eliminates the need to lift a large volume of brine to the surface for disposal.

Referring to FIG. 9, an inlet orifice 68 of the outlet pipe 64 is preferably located adjacent the outlet orifice 70 of the inlet pipe 62. This further aids in directional dissolution as the injected water will take the shortest, least resistive path, being back into orifice 68. The pad of oil or hydrocarbon liquid 66 preferably occupies the elongated chamber 60 above such inlet orifice 68. The flow of weak brine is indicated by arrows in FIG. 9 entering the inlet orifice 68 of the outlet pipe 64. The oil or hydrocarbon liquid 66 is preferably recovered following the formation of the elongated chamber 60.

c') Placing the Well Pipe in the Plastic Salt.

Once the elongated chamber 60 reaches plastic salt, the inlet pipe 62 and outlet pipe 64 are removed therefrom. The well pipe 40 may be subsequently inserted into the elongated chamber 60 as shown in FIG. 10 and lowered using weights or the like in the manner previously disclosed herein. Preferably, the well pipe 40 sinks through the plastic portion of the salt dome 14.

Referring again to FIG. 5, as the well pipe 40 displaces the plastic salt the salt passes up through the annular opening between the elongated chamber 66 and into the cavern 44. As shown in FIG. 6, the well pipe 40 preferably passes through the entire salt dome 14 and rests upon the underlying rock 18. The heat exchanger internals 52 and 54 may be inserted into the well pipe 40 as described above with reference to FIG. 7 to complete the geothermal well 10.

c") Placing the Well Pipe in the Plastic Salt—First Alternate Embodiment.

In reality, the salt is unlikely to freely pass from the sufficiently plastic region up through the cooler region of the elongated chamber 60 as the salt will tend to become more viscous within the chamber 60, thus blocking the movement of salt from the lower region into the upper chamber 44. To overcome this problem, a lower chamber 47, shown in FIG.

15, may advantageously be dissolved at the bottom of the elongated chamber 60 in the sufficiently plastic region of the salt. The dissolution is preferably accomplished by the method wherein a double pipe arrangement forming an annulus is used, as shown in FIG. 9. This has the advantage of reducing further dissolution of salt from the elongated chamber 60 which would result from the migration of large amount of brine from the lower chamber 47 passing through the elongated chamber 60 into the upper chamber 44.

The lower chamber 47 preferably has sufficient volume to receive the plastic salt displaced by the lowering of the well pipe 40 through the plastic region of salt to, preferably, the bottom of the salt dome and against lower strata 18 plus an allowance for contingencies. As described previously, once the well pipe 40 reaches its lowermost point of travel, it is converted into a double-pipe heat exchanger 50 to extract heat from the formation.

c''') Placing the Well Pipe in the Plastic Salt—Second Alternate Embodiment.

Figure 9A:
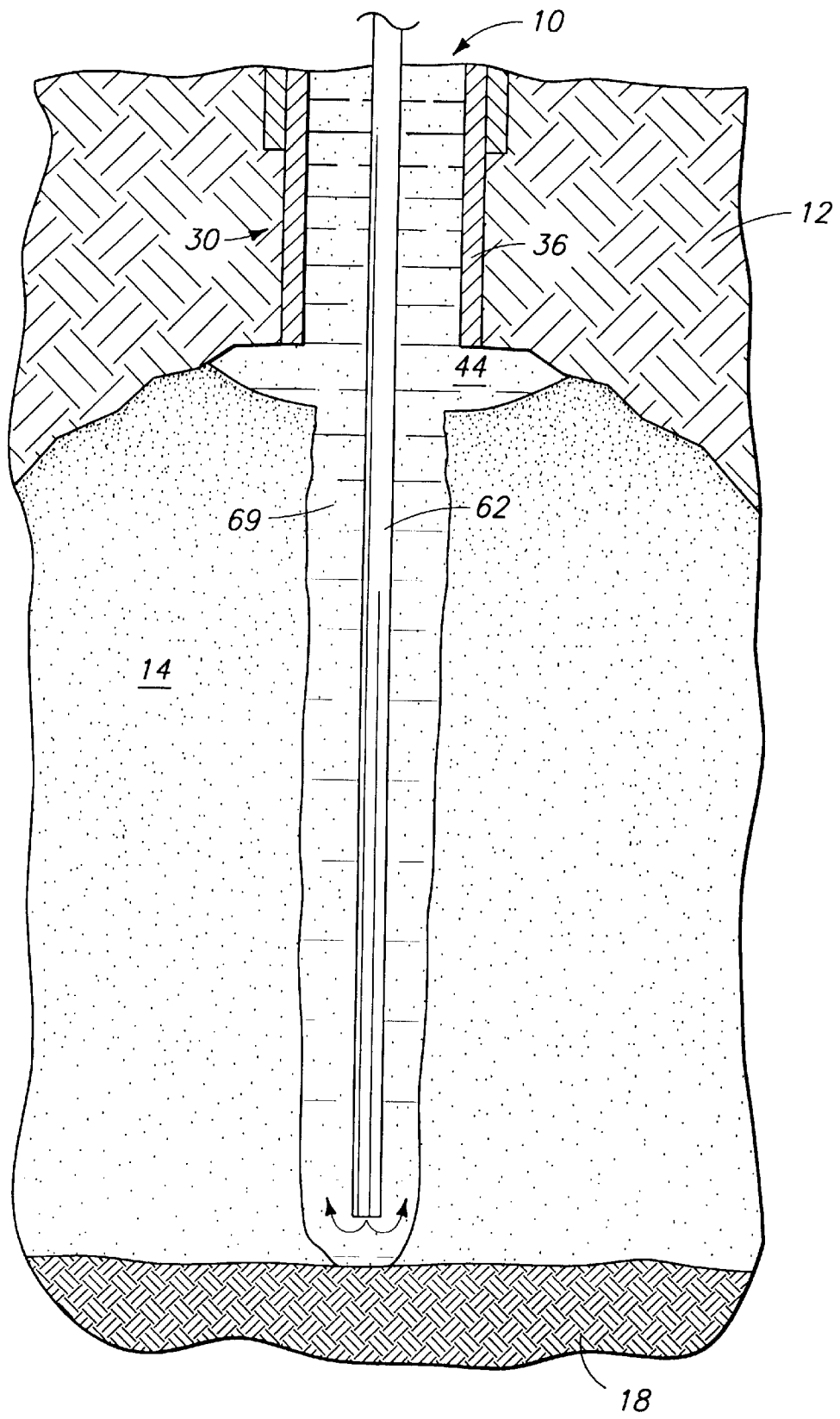

In another alternate embodiment, rather than sink the well pipe in the method described using weights or other means intended to displace plastic salt from around the sinking well pipe into an upper chamber, a continuous elongated chamber 69, shown in FIG. 9a, may be dissolved in the manner described previously for the elongated chamber 60. The continuous elongated chamber 69 would be dissolved to or near the desired endpoint for the well pipe 40. As with the directional dissolution of the upper chamber 60, an oil pad is preferably employed while forming the continuous elongated chamber 69 to ensure that the diameter of such chamber does not become excessive. A salt-to-well pipe contact will typically provide the best heat transfer, thus improving performance of the geothermal well. However, since the salt is plastic in this region, the salt will most likely close around the well pipe as a result of the forces exerted by the overburden on the salt.

III. Using the Well Pipe Itself to Dissolve the Salt and Form the Well in the Salt Dome.

Brief description of the method.

In a variation on the first and, particularly, second embodiments of the present invention, a modified well pipe can be used to dissolve the elongated chamber. The well pipe can be modified in several ways, with the common thread being that it is modified to allow water to be injected directly from the well pipe, thus eliminating the need for a separate step of dissolving the salt with a water line before inserting the well pipe.

In one embodiment, the well pipe is fitted with a pointed end having holes therethrough. Water is injected down the well pipe itself and passes out of the holes thus dissolving the salt at the end of the pipe.

In a second embodiment, the end of the well pipe is fitted with a pointed cap configured to form a void between the end of the well pipe and the cap. The cap has holes in it to allow fluid communication between the void and the well. Water is provided to the cap via a water supply line. The water passes out of the holes and dissolves salt at the end of the well pipe. The cap may be fitted with a brine return line to remove brine.

The method of using a modified well pipe to dissolve a passageway for the well pipe will now be described more fully with respect to the accompanying figures.

a) Placing the Modified Well Pipe in the Well.

Additional embodiments of the present invention for forming the well 10 within shallow and intermediate salt domes 14 are described herein with reference to FIG. 11–FIG. 14. The method may also be employed in deep salt domes. In particular, the well pipe itself 40 may be used to dissolve the elongated chamber 60 within the salt dome 14, rather than using inlet pipe 62 and outlet 64 and subsequently inserting the well pipe 40.

More specifically, referring again to FIG. 4, a cavern 44 is initially formed within the salt dome 14. Following the formation of the cavern 44, a well pipe 40 may be inserted into the well 10 as shown in FIG. 11. The well pipe 40 may be configured to permit the emplacement thereof simultaneously with the formation of the elongated chamber 60.

In this embodiment where the well pipe 40 is used to dissolve the salt, the well pipe preferably includes a first end 56 configured to dissolve the elongated chamber 60 beneath the cavern 44. The first end 56 is preferably tapered to assist the passage of the well pipe 40 through undissolved anhydride which may collect at the bottom of the elongated chamber 60.

b') Well Pipe with Modified End.

A first embodiment of the first end 56 is shown in detail in FIG. 12. The first end 56 of the well pipe 40 is preferably hollow. Water is pumped into the well pipe 40 and passes downward intermediate the wall 72 of the well pipe 40 and a plurality of weights 48. Weights 48 are preferably provided within the well pipe 40 to assist with the sinking of the well pipe 40 through both the cavern and/or holes formed by the dissolved salt and plastic salt in the manner described above.

A stool 74 configured to support the weights 48 may be placed within the well pipe 40. The stool 74 also includes a plurality of orifices 76 permitting the water to enter into the interior of the stool 74. The water subsequently passes into the hollow first end 56 and is forced through a plurality of orifices 78 formed therein. The water dissolves the salt adjacent the first end 56 to form the elongated chamber 60. Brine may pass upward along the exterior of the well pipe 40 towards the surface 16. The brine is displaced upwards by the descending well pipe 40 and/or the water pumped into it and may overflow at the surface 16.

The diameter of the first end 56 is preferably greater than the diameter of the well pipe 40 and the couplings 80 attached thereto. The elongated chamber 60 formed within the salt dome 14 is of sufficient diameter to permit the well pipe 40 to move downward without being impeded by the side walls of the elongated chamber 60.

Once the well pipe 40 either rests upon the underlying rock 18 or has otherwise sunk to a sufficient depth within the salt dome 14, flow from the well pipe to the salt must be stopped to prevent further dissolving of salt and loss of fluid circulation from the double-pipe heat exchanger. After the weights 48 have been removed, clay or other sealant may be introduced to the bottom of the well pipe 40 to seal the orifices 78 or the central aperture 56 which allows flow from the well pipe 40 to the first end 56 may be covered or sealed. Thereafter, the installed well pipe 40 is fitted with internals 52 and 54 and converted into a double-pipe heat exchanger as shown in FIG. 7.

An alternate configuration of the well pipe 40 is shown in FIG. 13. The well pipe 40 includes an interior supply pipe 82 for providing a first fluid, such as water, to the first end 56 of the well pipe 40 to assist with the dissolving of the elongated chamber 60. The weights 48 include a central aperture permitting the interior supply pipe 82 to pass therethrough. The stool 74 includes a mating orifice permitting the water to pass from the interior supply pipe 82 into the first end 56.

b") Well Pipe with Cap on End.

An alternate embodiment of the first end 56 of the well pipe 40 is shown in FIG. 14. A plurality of weights 48 are positioned within the well pipe 40. The first end 56 of the well pipe 40 includes a solid interior portion 84 and an outer cap 86 adjacent thereto. The exterior surface of the solid interior portion 84, and the outer cap 86 define an interior chamber 88. The outer cap 86 includes a plurality of orifices 90 providing fluid communication between the interior chamber 88 and the exterior of the outer cap 86.

A supply tube 92 is coupled with the outer cap 86 for introducing water into the interior chamber 88. Water is pumped into the interior chamber 88 and circulates through the orifices 90 as indicated by the arrows in FIG. 14. The water dissolves salt adjacent the first end 56 thereby forming the elongated chamber 60. An outlet tube 94 is coupled with the outer cap 86. The brine formed by this dissolving is either forced up the outlet tube 94 by the descending well pipe 40 and its contents, or flows up the elongated chamber 60 through any caverns 44 and 47 to the surface through the annulus between the casing 36 and the well pipe 40. The supply tube 92 and outlet tube 94 may be expendable and left within the well 10.

The weights 48 within the well pipe 40 assist with the sinking of the well pipe 40. The supply of water may be discontinued once plastic salt has been reached, provided the displaced salt can either migrate to an upper chamber or overcome the pressure of the overburden and move away from the downward progress of the well pipe. The well pipe 40 will then continue to sink through the plastic salt without the need for dissolving. Alternatively, combined sinking and dissolving can continue until the underlying strata and/or sufficient depth is reached. The weights 48 may be removed from the interior of the well pipe 40 once the well pipe 40 has reached either a sufficient depth or the underlying rock 18 as shown in FIG. 7. The heat exchanger internals 52 and 54 are placed into the interior of the well pipe 40 to form the double-pipe heat exchanger 10 as shown in FIG. 7.

IV. Use of a Well Emplaced Through a Salt Formation to Access the Strata Underneath Brief Description of the Method.

In the first and second embodiments of the invention, after the well is formed, geothermal energy is extracted using a double-pipe heat exchanger. In a third embodiment of the invention, thermal energy is extracted using hot dry rock heat mining. A fluid is injected down a first well and discharges from the well into the hot rock. A second well receives the fluid and returns it to the surface. In passing from the first well to the second well, the fluid passes through fractures in the rock (which may be formed synthetically using conventional hydrofracturing techniques), acquiring heat from the formation in the process. The rock of interest is the substrata that lies beneath the salt dome. The third embodiment is thus directed to penetrating the underlying rock.

In the third embodiment, a first well pipe is placed with its end against the upper surface of the underlying rock, using either the method of the first or second embodiment. Thereafter, a fluid is circulated through the well pipe to "freeze" the plastic salt near the end of the well pipe, i.e., render the salt sufficiently cool and viscous that there is no appreciable flow. The end of the well pipe is then drilled out and a short well drilled into the underlying rock. A sleeve is then inserted into the well to seal the interface between the bottom of the well pipe and the underlying rock. This prevents intrusion of salt into the well pipe, and/or loss of fluid into the salt dome. Drilling then continues into the underlying rock to a desired depth.

A second well pipe is then placed in the underlying rock proximate to the first well in the same manner as described for the first well pipe. Hydrofracturing may then be performed to create fluid passages in the underlying rock so that the first and second well are in fluid communication through the hot rock of the underlying strata. Fluid may then be injected into one of the wells and removed from the other having been heated by passage through the rock between the wells, thus extracting geothermal energy from the Earth.

The above method will now be described more fully with respect to the accompanying figures.

a) Forming a Well to the Bottom of the Salt Dome.

Multiple wells 10 may be created within a salt dome 14 and the heat mining technology of hot dry rock may be employed through the underlying rock 18. The method according to the present invention facilitates the installation of a well 10 within a salt dome 14 permitting access to the underlying rock 18 as shown in FIG. 16. Once the underlying rock 18 is reached, the drilling apparatus 32 and 34 of FIG. 2 may be reinserted into the well for drilling into the underlying rock 18 thereby providing access to hot rock therein. A method in accordance with the present invention provides for emplacing a well 10 within the salt dome 14 and at least a portion of the underlying rock 18.

b) "Freezing" the Salt at the Salt/Rock Interface.

It is desirable to provide the well pipe 40 with an open first end 83 enabling a drill tool 34 to extend through the well pipe 40 for drilling into the underlying rock 18, as shown in FIG. 17. Referring again to FIG. 16, a removable end cap 81 may be provided at the first end 83 of the well pipe 40 to prevent plastic salt or brine from flowing into the interior of the well pipe 40. The end cap 81 may be blunt if the well pipe 40 is emplaced within a plastic salt dome 14. Otherwise, the end cap 81 should be pointed to facilitate the sinking of the well pipe 40 through the salt dome 14.

In this embodiment, it is useful to have the salt behave in a non-plastic fashion in order to prevent intrusion of the salt into the well pipe 40 once the removable end cap 81 has been removed. One method of ensuring that the salt behaves non-plastically will now be described. An internal water pipe 85 of FIG. 16 may be provided within the well pipe 40 during the emplacement thereof within the salt dome 14. The internal water pipe 85 may be utilized to circulate a cooling fluid, such as water, within the well pipe 40. The outlet of the internal water pipe 85 is preferably adjacent the first end 83 of the well pipe 40. Water may be introduced into the internal water pipe 85 at the Earth's surface 16 (FIG. 1) and pumped downward therethrough into the well pipe 40. The water is pumped to the lower portion of the internal water pipe 85 of FIG. 16 adjacent the first end 83 of the well pipe 40. The water is thereafter circulated upwards toward the Earth's surface 16 through the annulus 87 formed intermediate the internal water pipe 85 and the well pipe 40.

An insulating layer (not shown) may be provided about the internal water pipe 85 to provide thermal separation of the fluid within the internal water pipe 85 and the annulus 87. The circulating of the cooling fluid through the well pipe 40 removes heat from salt immediately surrounding the well pipe 40. The cooling fluid increases the viscosity of the salt within the region 89 shown in FIG. 16. The cooled salt within the region 89 will not easily flow thereby reducing the amount of salt which may enter the well pipe 40 once the end cap 81 has been removed from the first end 83.

c) Sealing the Salt/Rock Interface.

Following the installation of the well pipe 40 within the salt dome 14 in accordance with the methods described above, the end cap 81 is removed providing access to the underlying rock 18. Referring to FIG. 17, a drill tool 34 and drill stem 32 may be inserted into the well pipe 40. The end cap 81 may be expendable and the drill tool 34 may be drilled through the end cap 81 of FIG. 16 to provide access to the underlying rock 18. The well 10 may then be extended into the underlying rock 18.

Preferably, the well is only initially extended a short distance of between 10–30 feet into the underlying rock 18. Thereafter a short inner pipe 91, or sleeve, may be introduced into the well pipe 40 following the extension of the well 10 into the underlying rock 18, as shown in FIG. 18, to prevent intrusion of salt into the well. The short inner pipe 91 preferably has an exterior diameter configured to provide a close fit with the interior of the well pipe 40. The inner pipe 91 is positioned at the bottom of the well pipe 40 as shown. Heat from the salt dome 14 may cause the inner pipe 91 to expand forming a seal with the well pipe 40 thereby reducing the amount of salt which may enter the well pipe 40 through the open end.

d) Completing the Well.

The well pipe 40 may be utilized as a caisson and drilling may then proceed through the underlying rock 18. Drill stem 32 and drill tool 34a may be introduced into the well 10 to form a well bore 93 having a smaller diameter than the well pipe 40 or the elongated chamber 60 formed within the salt dome 14. In particular, the well bore 93 may have a diameter approximately equal to the interior diameter of the inner pipe 91. Drilling continues through the underlying rock 18 for an adequate distance (e.g., 5,000 to 10,000 feet) to reach hot rock.

e) Forming the Second Well.

Following the formation of a first well 10a shown in FIG. 19, a second well 10b may be formed adjacent thereto. Further, additional wells may be formed adjacent the first well 10a. The wells 10a and 10b are preferably joined by hydraulic fracturing connections 95 resulting from the formation of the respective chambers 93a and 93b. Thereafter, heat mining technology of hot dry rock may be employed.

f) Heat Mining.

In particular, a heat-transfer fluid may be introduced into the well pipe 40a of the first well 10a. The heat-transfer fluid may be pumped to the lower portion of the well 10a and through the hydraulic fracturing connections 95 intermediate the adjacent wells 10a and 10b. The heat-transfer fluid is heated by the surrounding hot rock and subsequently recovered or pumped through the well pipe 40b of the second well 10b to the Earth's surface 16. The heated heat-transfer fluid may be utilized to generate electricity via the generator 20 and turbine 22 of FIG. 1.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of emplacing a well pipe with a closed bottom end into a salt formation comprising the steps of:
   a) drilling overburden above said salt formation;
   b) dissolving a cavern within said salt formation, said cavern having a volume at least equal to the volume of salt which would be displaced by the well pipe sinking to the bottom of the salt formation;
   c) sinking at least a portion of said well pipe through a sufficiently plastic region of said salt formation using gravity.

2. A method of emplacing a well pipe with a closed bottom end into a salt formation, said salt formation containing, when entered, a sufficiently hot and plastic region to allow sinking at an economically useful rate, comprising:
   a) drilling and casing a well through said overburden and into an upper region of said salt formation;
   b) dissolving a first cavern within said upper region of said salt formation, said cavern having a volume at least equal to the volume of salt which would be displaced by the well pipe sinking to the bottom of the salt formation plus contingencies, said cavern being filled with liquid;
   c) inserting a pipe with a closed bottom end filled with liquid through said casing and into said first cavern;
   d) placing removable weights into the closed bottom end pipe so that said pipe sinks through the sufficiently hot and plastic region, said pipe displacing the plastic salt into said first cavern;
   e) removing the weights from the pipe and inserting an insulated pipe with open ends into the pipe with the closed bottom end, the combination forming a double pipe heat exchanger; and
   f) circulating a working fluid through the double pipe heat exchanger and an energy extracting system to generate power.

3. The method of claim 2 wherein the salt when entered is not sufficiently hot and plastic to allow sinking at an economically useful rate, and further comprising the steps of:
   a) following the step of dissolving said first cavern dissolving a hole through the salt to the sufficiently hot and plastic region; and
   b) dissolving a second cavern at the bottom of said hole, said second cavern having a volume at least equal to the volume of salt which would be displaced by the well pipe sinking to the bottom of the salt formation plus contingencies;
   c) and wherein in step (c) of claim 2, the well pipe is further located through the first cavern, the hole, and into the second cavern.

4. The method of claim 2 in a salt formation wherein the salt when entered is not sufficiently hot and plastic to allow sinking of the well pipe at an economically useful rate comprising emplacing said well pipe after said dissolving of said first cavern, then dissolving said salt formation and sinking said well pipe at the same time.

5. The method of claim 4, wherein:
   the well pipe comprises a first end, said first end of said pipe being pointed and having openings disposed therethrough through which water may pass;
   said weights are positioned such that they do not block water supplied to said openings;
   the method further comprising, between steps (d) and (f) of claim 2, the additional steps of:
   a) providing water to said openings through said well pipe via a water supply;
   b) adding additional pipe sections along with additional weights to said well pipe as the well pipe sinks toward the bottom of the salt formation, said pipe sections being connected to the water supply for dissolving salt adjacent said opening;
   c) displacing brine formed by the dissolving by sinking said well pipe such that said brine flows up the cavern and out of either one of said well casing or through a brine removal pipe;
   d) upon completion of the sinking of said well pipe, removing said weights and sealing said openings in said first end of said well pipe, and
   installing an insulated pipe with open ends into said well pipe thus converting it into a double pipe heat exchanger.

6. The method of claim 4 wherein the dissolving is carried out by attaching to a first end of said well pipe a distribution device, said device being supplied water to produce brine, said distribution device comprising at least one brine removal pipe for removing said brine.

7. A method of forming a heat exchanger in a subterranean formation having a salt formation, comprising:
   a) drilling overburden above said salt formation;
   b) dissolving salt within said salt formation;
   c) emplacing a well pipe in the salt formation using gravity, wherein the well pipe reaches to the bottom of the salt formation to thereby form a caisson to access heat containing strata beneath the salt formation.

8. The method of claim 7 wherein a well pipe emplaced in a salt formation is connected to the subsalt strata by the following steps:
   a) removing any said weights from the well pipe that were placed in it to aid its sinking, said well pipe being filled with water or brine;
   b) inserting an insulated pipe with open ends into the well pipe to convert it into a double pipe heat exchanger having an annulus between said insulated pipe and the well pipe;
   c) circulating coolant down the insulated pipe and up the annulus for the purpose of lowering the temperature of the salt in contact with the bottom of the well pipe and rendering it sufficiently viscous that it will not flow into the well pipe when its end is removed;
   d) removing the insulated inner pipe from the well pipe;
   e) filling the well pipe with at least one of water, heavy brine, or mud to prevent collapse and minimize any pressure difference and salt flow when the end of the well pipe is removed;
   f) inserting first drilling equipment into the well pipe;
   g) drilling off the end of the well pipe proximate the subsalt strata;
   h) drilling half the length of a pipe section into the subsalt strata;
   i) removing the drilling equipment;
   j) inserting a section of pipe defined by a length inside the well pipe so that approximately half of said length is in the well pipe and the remainder is in the subsalt strata;
   k) sealing said section of pipe to the well pipe and the subsalt strata so that salt cannot penetrate or the contents of the well pipe leak out; and
   l) inserting second drilling equipment which fits into the section of pipe into the well and drilling into the subsalt strata.

9. The method of claim 8 used to emplace a plurality of well pipes an appropriate distance into the subsalt strata to produce geothermal energy by employing the technology for Hot Dry Rock further comprising:
   connecting said well pipes to the subsalt strata;
   using said well pipes as caissons, extending the wells a appropriate distance into the subsalt strata by drilling;
   hydrofracting a connection between the plurality of wells; and
   circulating a working fluid down at least one well into the subsalt strata where it is heated, and removing the heated fluid through at least one other well.

10. A method of installing a well in a subterranean formation, the method comprising the steps of:
   a) forming a shaft within a first subterranean material;
   b) dissolving a cavern within a second soluble subterranean material, said second subterranean material lying beneath said first subterranean material;
   c) inserting a well pipe with a closed end into the shaft; and
   d) sinking the well pipe using gravity through a sufficiently hot and plastic region of the second subterranean material.

11. The method according to claim 10 further comprising the step after step a. of casing at least a portion of the shaft.

12. The method according to claim 10 wherein the second subterranean material is salt.

13. The method according to claim 10 wherein the cavern is dissolved beneath the shaft formed within the first subterranean material.

14. The method according to claim 10 wherein the volume of the cavern is at least equal to the volume of the second subterranean material displaced by the well pipe having a closed bottom end.

15. The method according to claim 10 wherein the well pipe has a conical first end.

16. The method according to claim 10 further comprising the step of introducing a fluid into the well pipe having a closed bottom end.

17. The method according to claim 10 further comprising a step before step d. of applying at least one weight to the well pipe.

18. The method according to claim 17 further comprising the step of removing at least one weight from the well pipe.

19. The method according to claim 10 further comprising the step of inserting an insulated pipe with open ends into the well pipe thereby converting the closed end well pipe into a double-pipe heat exchanger.

20. The method according to claim 19 further comprising the steps of introducing a heat-transfer fluid into the heat exchanger and removing the heat-transfer fluid therefrom.

21. The method according to claim 10 further including a step after step b. of forming an elongated chamber within the second subterranean material below the cavern.

22. In the method of claim 21 wherein said well pipe is defined by an outside diameter, forming said elongated chamber such that the diameter thereof is at least equal to the outside diameter of the well pipe.

23. The method according to claim 21 wherein the well pipe is inserted through the shaft, the cavern, and the elongated chamber.

24. The method according to claim 21 wherein the well pipe includes a hollow conical first end.

25. The method according to claim 24 wherein the first end includes a plurality of orifices.

26. The method according to claim 24 wherein the step of forming the elongated chamber includes the steps of applying a first fluid to the first end to produce brine, and removing the brine.

27. The method according to claim 26 further comprising the step of applying a second fluid into the elongated chamber.

28. The method according to claim 21 further comprising a step of forming a lower cavern within the second subterranean material.

29. The method according to claim 28 wherein the volume of the lower cavern is at least equal to the volume of the second subterranean material displaced by the well pipe.

30. The method according to claim 10 further comprising the step of forming a shaft within a third subterranean material, said third subterranean material lying beneath said second subterranean material.

31. The method according to claim 30 further comprising a step of inserting an inner pipe into the well pipe to connect said well pipe to the shaft within the third subterranean material.

32. The method according to claim 30 further comprising the step of introducing a heat-transfer fluid into the shaft within the third subterranean material.

* * * * *